United States Patent
Pang et al.

(10) Patent No.: US 11,363,262 B1
(45) Date of Patent: Jun. 14, 2022

(54) ADAPTIVE GOP STRUCTURE USING TEMPORAL DEPENDENCIES LIKELIHOOD

(71) Applicant: GOOGLE LLC, Mountain View, CA (US)

(72) Inventors: Ching Yin Derek Pang, San Jose, CA (US); Yeping Su, Palo Alto, CA (US); Yao-Chung Lin, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 4 days.

(21) Appl. No.: 17/121,349

(22) Filed: Dec. 14, 2020

(51) Int. Cl.
*H04N 19/105* (2014.01)
*H04N 19/176* (2014.01)
*H04N 19/177* (2014.01)
*H04N 19/114* (2014.01)
*H04N 19/159* (2014.01)

(52) U.S. Cl.
CPC ......... *H04N 19/114* (2014.11); *H04N 19/105* (2014.11); *H04N 19/159* (2014.11); *H04N 19/176* (2014.11); *H04N 19/177* (2014.11)

(58) Field of Classification Search
CPC .......................... H04N 19/114; H04N 19/105
See application file for complete search history.

(56) References Cited

U.S. PATENT DOCUMENTS

| | | | | |
|---|---|---|---|---|
| 8,532,187 B2* | 9/2013 | Jeon | ...................... | H04N 19/63 375/240.22 |
| 9,210,446 B2* | 12/2015 | Kumar | ................... | H04N 19/89 |
| 9,438,898 B2* | 9/2016 | Xiu | ...................... | H04N 19/172 |
| 9,621,917 B2* | 4/2017 | Kottke | ................. | H04N 19/517 |
| 10,091,507 B2* | 10/2018 | Lee | ....................... | H04N 19/176 |
| 10,284,853 B2* | 5/2019 | Gokhale | ............... | H04N 19/40 |
| 10,841,604 B2* | 11/2020 | Horowitz | .............. | H04N 19/31 |
| 11,159,801 B2* | 10/2021 | Kottke | ................. | H04N 19/154 |
| 2006/0165176 A1* | 7/2006 | Raveendran | ......... | H04N 19/172 375/240.22 |
| 2007/0200923 A1* | 8/2007 | Eleftheriadis | ...... | H04N 21/4788 348/14.08 |
| 2007/0230565 A1* | 10/2007 | Tourapis | .............. | H04N 19/107 375/E7.176 |
| 2014/0301436 A1* | 10/2014 | Wang | ..................... | H04N 19/70 375/240.02 |
| 2015/0281709 A1* | 10/2015 | Bracha | .................. | H04N 19/65 375/240.26 |

(Continued)

FOREIGN PATENT DOCUMENTS

WO    WO-2004100556 A2 *    11/2004    ........... H04N 19/124

*Primary Examiner* — Irfan Habib
(74) *Attorney, Agent, or Firm* — Young Basile Hanlon & MacFarlane, P.C.

(57) ABSTRACT

A first aspect is a method for coding a group of pictures (GOP) that includes frames of a video. The method includes encoding, at least some of the frames of the GOP, using a first encoding pass to obtain encoding statistics; obtaining, using the encoding statistics, respective temporal dependency likelihoods (TDLs) for the at least some of the frames of the GOP, where the respective TDLs indicate contributions that the at least some of the frames make in reducing prediction errors of the GOP; obtaining a reference frame based on the respective TDLs; and using the reference frame in encoding at least some of the frames of the GOP in a second encoding pass.

20 Claims, 13 Drawing Sheets

(56) References Cited

U.S. PATENT DOCUMENTS

| | | | | |
|---|---|---|---|---|
| 2016/0198166 A1* | 7/2016 | Kudana | ............... | H04N 19/11 375/240.15 |
| 2019/0200053 A1* | 6/2019 | Van Veldhuisen | ........................ | H04N 21/23406 |
| 2021/0076040 A1* | 3/2021 | Abe | ..................... | H04N 19/18 |

* cited by examiner

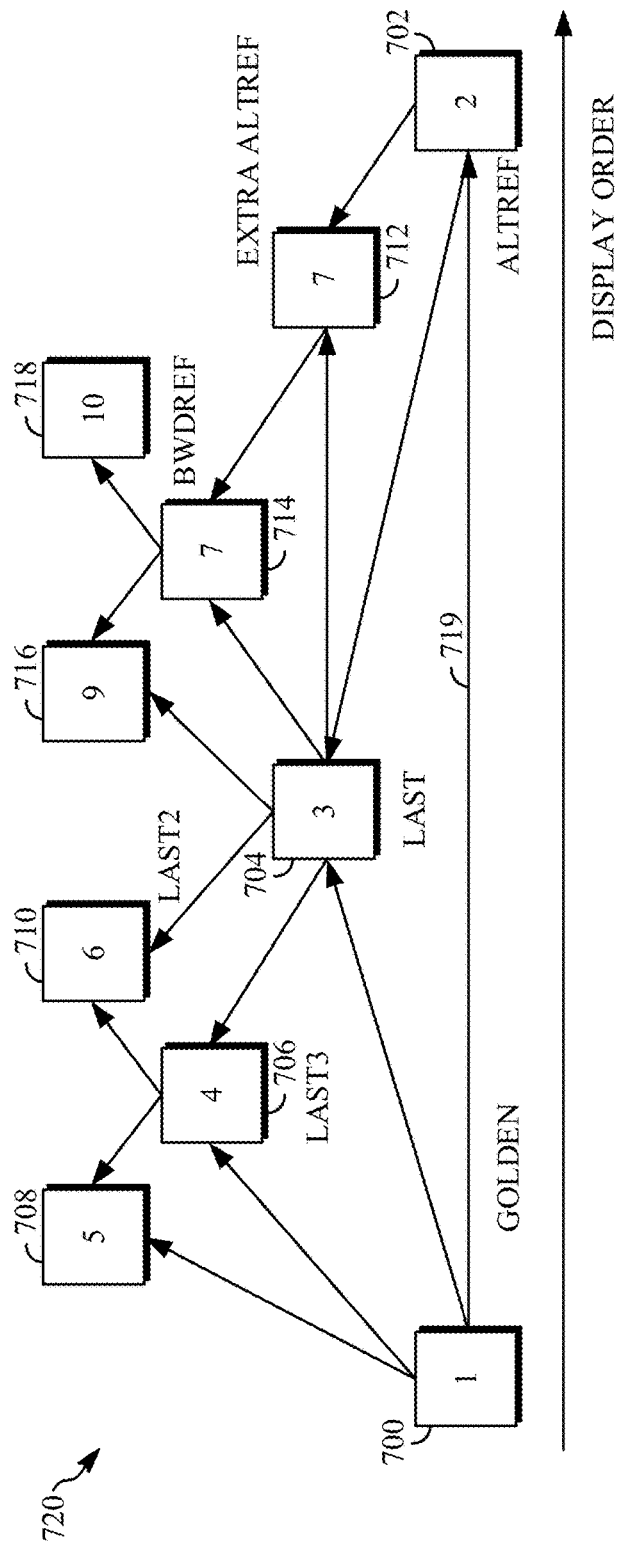
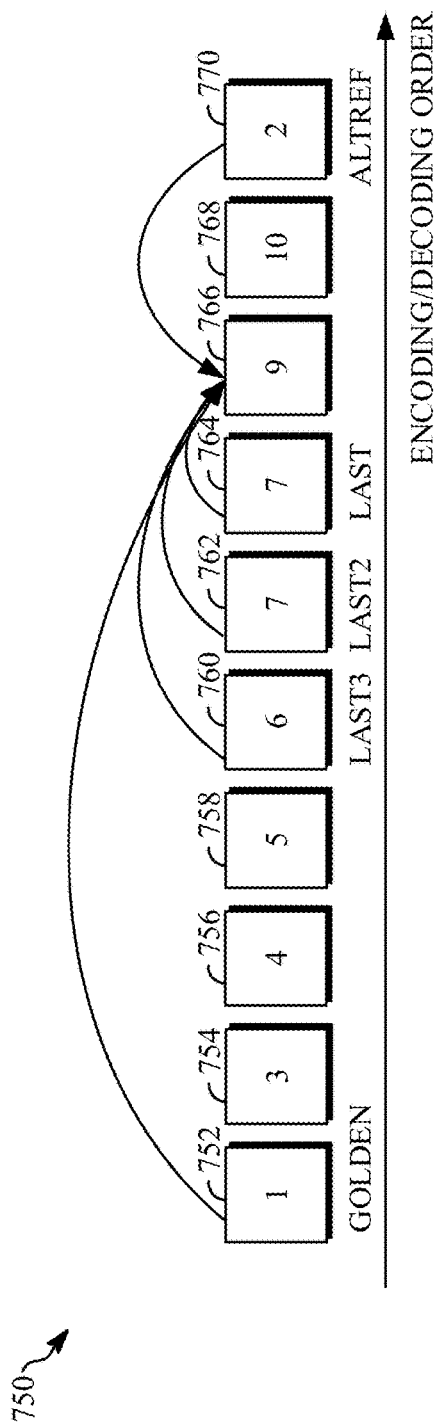
FIG. 7A
FIG. 7B

ADAPTIVE GOP STRUCTURE USING TEMPORAL DEPENDENCIES LIKELIHOOD

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block of a frame to be encoded. Differences between the prediction block and the current block can be encoded, instead of the values of the current block themselves, to reduce the amount of data encoded. The reference frame used is highly relevant to (e.g., determinative of, related to, etc.) the prediction quality and the distortion in reconstructed frames as compared to source frames.

SUMMARY

A first aspect is a method for coding a group of pictures (GOP) that includes frames of a video. The method includes encoding, at least some of the frames of the GOP, using a first encoding pass to obtain encoding statistics; obtaining, using the encoding statistics, respective temporal dependency likelihoods (TDLs) for the at least some of the frames of the GOP, where the respective TDLs indicate contributions that the at least some of the frames make in reducing prediction errors of the GOP; obtaining a reference frame based on the respective TDLs; and using the reference frame in encoding at least some of the frames of the GOP in a second encoding pass.

A second aspect is an apparatus for encoding a group of pictures (GOP) that includes frames of a video. The apparatus includes a processor that is configured to obtain, during a first pass encoding, first respective temporal dependency likelihoods (TDLs) for the frames of the GOP excluding a first frame of the GOP; obtain a first reference frame using a frame of the GOP corresponding to a highest TDL of the TDLs; encode, as a first encoding layer, the intra-predicted frame and the first reference frame in a second pass encoding; and encode, as a second encoding layer, a first subset of the frames of the GOP using the intra-predicted frame and the first reference frame in the second pass encoding. A TDL of a frame of the GOP is a measure of a prediction error when the frame is used as a reference frame for encoding frames of the GOP. The first frame of the GOP is an intra-predicted frame.

A third aspect is an apparatus for decoding a group of pictures (GOP) that includes frames of a video. The apparatus includes a processor that is configured to decode a reference frame from a compressed bitstream; and decode at least one of frames of the GOP using the reference frame. The GOP is such that an encoder encoded the reference frame in the compressed bitstream by operations including operations to encode, at least some of the frames of the GOP, using a first encoding pass to obtain encoding statistics; obtain, using the encoding statistics, respective temporal dependency likelihoods (TDLs) for the at least some of the frames of the GOP, where the respective TDLs indicate contributions that the at least some of the frames make in reducing prediction errors of the GOP; obtain the reference frame based on the respective TDLs; and use the reference frame in encoding at least some of the frames of the GOP in a second encoding pass.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views.

FIG. 7A is a diagram of an example of a multi-layer coding structure.

FIG. 7B is a diagram of an example of a one-layer coding structure.

DETAILED DESCRIPTION

Figure 1:
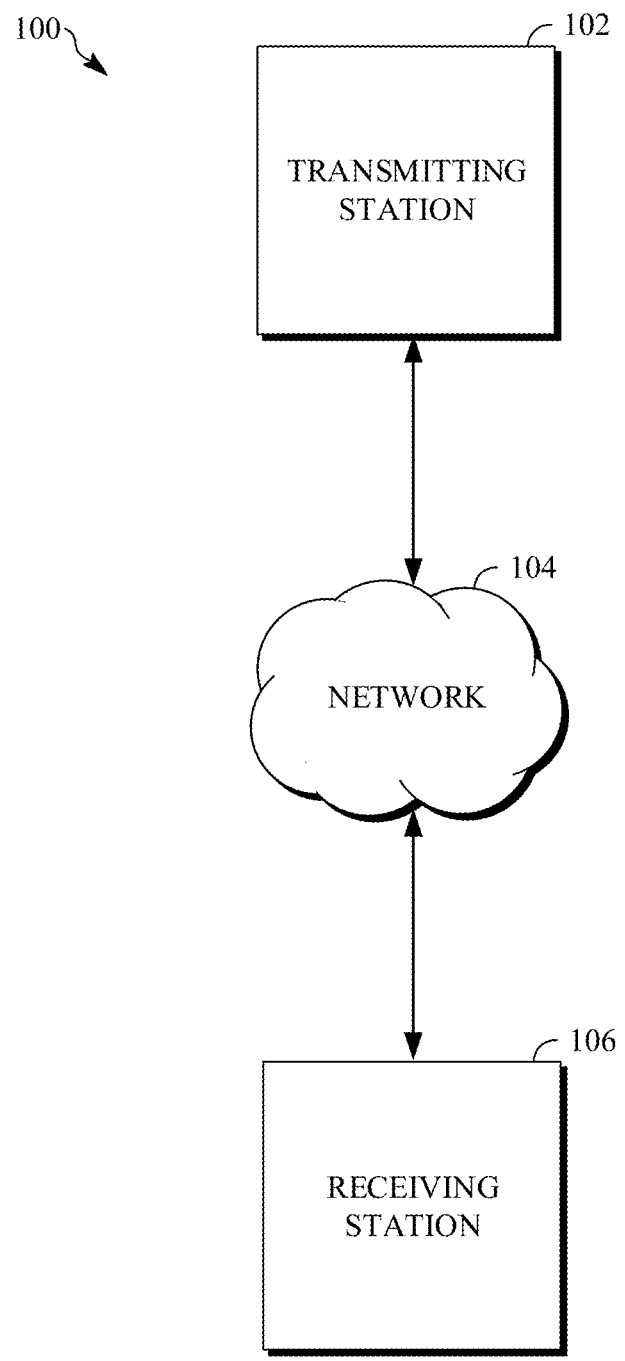
FIG. 1 is a schematic of a video encoding and decoding system.

As mentioned above, compression schemes related to coding video streams (i.e., a video sequence) may include breaking frames (i.e., images or pictures) of the video sequence into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal or spatial similarities in the video stream to improve coding efficiency.

For example, a current block of a frame may be encoded based on identifying a difference (i.e., a residual) between the previously coded pixel values, or between a combination of previously coded pixel values, and those in the current block.

Encoding using spatial similarities can be known as intra prediction. Intra prediction attempts to predict the pixel values of a block of a frame of video using pixels peripheral to the block; that is, using pixels that are in the same frame as the block but that are outside the block. Intra prediction can be performed along a direction of prediction where each direction can correspond to an intra prediction mode.

Encoding using temporal similarities can be known as inter prediction. Inter prediction attempts to predict the pixel values of a block using a possibly displaced block or blocks from a temporally nearby frame (i.e., reference frame) or frames. A temporally nearby frame is a frame that appears earlier or later in time in the video stream than the frame of the block being encoded. A prediction block resulting from inter prediction is referred to herein as inter predictor.

Inter prediction is performed using a motion vector. A motion vector used to generate a prediction block refers to a frame other than a current frame, i.e., a reference frame. Reference frames can be located before, after the current frame in the sequence of the video stream, and/or may not be frames of the video sequence. When coding a block of a frame, the block can be predicted using available reference frames. The reference frames available for encoding blocks of a current frame can be stored in a reference frame buffer. Some codecs use up to eight (available) reference frames. The motion vector can refer to (i.e., use) one of the reference frames of the frame buffer.

Two predictor blocks can be combined to form a compound predictor for a block or region of a video image. A compound predictor can be created by combining two or more predictors determined using, for example, the aforementioned prediction methods (i.e., inter and/or intra prediction). For example, a compound predictor can be a combination of a first predictor and a second predictor which can be two intra predictors (i.e., intra+intra), an intra predictor and an inter predictor (i.e., intra+inter) or two inter predictors (i.e., inter+inter). For example, in the case of inter+inter, compound inter prediction can employ a first motion vector to obtain a predictor from a first reference frame, and a second motion vector to obtain a predictor from a second reference frame. The reference frames can both be in the past, both in the future, or some combination thereof. The second motion vector can be independent of, or derived from, the first motion vector. As another example, and in the case of intra-inter, compound prediction can employ a first predictor generated by an intra prediction operation and a second predictor generated by an inter prediction operation.

In forming the compound predictor, an encoder can perform averaging, a weighted combination, a filtering operation, or a more complex form of estimating the significance of the value of each predictor, e.g., on a per-pixel basis to generate pixel values for the combined predictor using pixels of the two individual predictors.

A motion vector can be selected from a reference motion vector list of candidate reference motion vectors. The candidate reference motion vectors can include motion vectors from any previously coded (or decoded) blocks in the video stream, such as a block from a previously coded (or decoded) frame, or a block from the same frame that has been previously encoded (or decoded). In an example, the candidate reference motion vectors can be obtained from a co-located block (of the current block) and its surrounding blocks in a reference frame. For example, the surrounding blocks can include a block to the right, bottom-left, bottom-right of, or below the co-located block. In the case of non-compound inter prediction (i.e., single inter prediction), the candidate reference motion vectors for a block can include, for at least some reference frames, a single predictor motion vector per reference frame that can be the best motion vector for that reference frame. In the case of compound inter prediction, pairs of reference frames can be evaluated to determine a best motion vector(s) per pair of reference frames. The best motion vector(s) per pair can be included in a reference motion vector list.

In any case (i.e., intra, inter, or compound prediction), a prediction block is generated and can be subtracted from the block to be encoded to form the residual block representing the difference between the blocks.

A codec may partition (e.g., group) a video sequence into groups of pictures. The terms group of pictures (GOP), group of frames, and golden-frame group (GF group) may be used interchangeably herein. A GOP is a successive group of frames of the video sequence. The GOPs are non-overlapping groups of frames. To illustrate, and without loss of generality, a video sequence having 150 frames may be partitioned into 10 GOPs each containing 15 frames, 15 GOPs each containing 10 frames, or some other division. Temporal dependencies in one GOP do not typically propagate to another GOP.

The GOPs of the video sequence need not have the same number of frames. The number of frames of a GOP is referred to as the length of the GOP. For example, a video sequence can be partitioned into GOPs where a GOP can have a length between 4 and 16 frames. The number of frames forming each group of frames can vary according to the video spatial/temporal characteristics and other encoded configurations, such as the key frame interval selected for random access or error resilience, for example. The number of frames forming each group may be determined by a first pass of a two- or a multi-pass encoder, such as the encoder 400 of FIG. 4.

In the first pass, statistics regarding the frames to be encoded are gathered and used for further processing in the second pass. The statistics can include the level of motion across frames of the video sequence, the frame rate, the frame resolution, etc. For example, the less motion across a sequence, the larger the number of frames within a group of frames may be.

As mentioned above, a GOP is a group of successive frames of a video sequence. That is, regardless of the coding order of the frames of the GOP, the first frame of the GOP is displayed first, the second frame of the GOP is displayed next, and so on.

The performance of a coding structure can depend on which reference frames are used for encoding which other frames of the GOP in the different layers, if any, of the coding structure. The performance of a coding structure refers to the efficacy of the compression (i.e., level of compression, amount of distortion in reconstructed frames, etc.) using the coding structure. For example, using motion estimation, and as described above, a block of a current frame may be predicted using one or multiple reference blocks available in previously coded frames. The reference blocks can be used to construct a prediction block. The differences between the prediction block and the current block can then be included, such as after transformation and quantization as described below, in a compressed bitstream. When the encoder compresses a next frame, the encoder may use previously encoded frames, including the current frame, and the same process repeats itself. As a result, the quality of an encoded current frame can impact the quality of subsequent video frames.

Disclosed herein are low-complexity techniques that can adaptively select a single or multi-layered GOP encoding structures with efficient rate-distortion performance by exploiting temporal dependencies between frames of a video sequence.

Video codecs often require proper encoding frame ordering to provide a prediction or a GOP structure with optimal rate-distortion performance. However, finding the optimal prediction (i.e., encoding) structure is a combinatorial problem that may be cost prohibitive to perform, especially for a prediction structure with multiple hierarchical layers. Furthermore, hardware video encoders often have limited feedback information available to such decision-making processes. For example, many encoders account for temporal dependencies between frames when performing rate-distortion optimization in mode decision and quantization, but they require explicit motion vector dependency mapping or tight feedback integration inside the encoding process. For a given inter-predicted block, explicit motion vector dependency mapping refers to tracing back, for the block, and using motion vectors, which upstream frames were used, directly or indirectly, in predicting the block.

First pass encoding statistics are conventionally used for allocating bit rates to frames (e.g., allocating more bits to frames with higher number of temporal dependencies), for determining whether and/or how frequently to encode alternative (i.e., constructed) reference frames, for determining how many bits to allocate to reference frames in a subsequent (e.g., second) pass of the encoding mechanism, for selecting quantizer step sizes, for other encoding decisions, and/or a combination thereof. In the conventional approaches, selection of reference frames may be limited.

In one conventional approach, the GOP encoding structure may be fixed to one order. For example, a future display frame (e.g., the last frame of the GOP) can be selected as the reference frame, or can be selected to synthesize an alternate reference frame (ARF) at a fixed interval. Another conventional approach may use scene-adaptive GOP size or encoding ordering. For example, a scene cut or a large change in a scene (e.g., a large change from one frame to the next frame) may be adaptively detected, such as by detecting fading and/or transitions, using image and statistical analysis. The GOP interval can then be adjusted accordingly or a reference frame may be inserted to match the detected scene change. In yet another conventional approach, which is adopted in the x264 encoder, a bidirectional predicted frame (B-frame) may be adaptively placed using a Viterbi algorithm.

To address these issues, the techniques disclosed herein only requires limited feedback information and can support multi-layer prediction (i.e., multi-layer encoding structures). Implementations according to this disclosure have yielded better rate-distortion performance compared to some traditional approaches and could offer additional savings of more than 1% egress to hardware-accelerated video streaming.

Implementations according to this disclosure obtain (e.g., determine, calculate, select, infer, etc.) temporal dependency likelihood (TDL) scores (or simply, TDLs) for frames of a GOP to determine (e.g., choose, calculate, obtain, select, etc.) a GOP encoding structure. A TDL of a frame indicates how the prediction dependency propagates from the frame to other different video frames. The TDLs can be obtained from a temporal dependency model that can be or can include encoding statistics from a first encoding pass. Determining the encoding structure can be performed within a rate-control process, which can use a lookahead window. As such, determining the encoding structure can be performed within a rate-control lookahead window. To construct the temporal dependency model, the techniques disclosed herein can rely on a two-pass or multi-pass encoding technique.

The TDL can be a measure of the total contribution that the frame makes in reducing the prediction errors within the lookahead window. As further described below, implementations according to this disclosure can be used to obtain a single or multi-layer prediction (i.e., encoding) structures. A first block of a first frame may be used as a reference block for second blocks of second frames, which in turn may be used as reference blocks for third blocks in third frames. Thus, a given block of a frame can be thought of as a root of a tree of dependent blocks in other frames and where the motion vectors can be thought of as the connections (e.g., links, branches) in the tree. Thus, a total contribution of a frame can be thought of as the sum of contributions (e.g., the number of children) of the blocks of the frame. Said another way, the contribution of a frame can be thought of as a measure of the direct and indirect use of the blocks of the frame by subsequent blocks in subsequent frames.

In another example, a weighting of the blocks of the tree can additionally be used in calculating the TDLs. For example, given a reference frame, some blocks in first frames may be easier than blocks in second frames to predict because the first frames of more similar to the reference frame than the second frames. Thus, decoding errors between blocks of a reference frame and predicted blocks using the reference frame can be used in the TDL calculations: the lower (higher) the decoder error, the higher the chances that the reference frame is a more (less) reliable reference frame.

Examples of obtaining the total contribution of a frame (i.e., the TDL of a frame) are further described below.

After obtaining TDLs for a set of frames (which may be less than a GOP), it can be determined which of the frames has the highest likelihood of being used as a common reference frame for that set of frames resulting in a smaller error than using another frame as the reference frame. In an example, the frame with the highest probability (i.e., highest TDL) can itself be selected as the reference frame. In another example, an alternative reference frame (ARF) can be synthesized from the frame with the highest TDL. In yet another example, an ARF can be obtained from more than one frame having the highest TDLs. This process can be repeatedly performed on sets of frames, as further described below, to obtain a multi-layer encoding structure.

Several techniques, or combination of techniques, can be available for synthesizing an ARF from a selected frame. For example, the ARF can be a filtered copy of the selected frame. For example, temporal filtering can be used to remove noise. In an example, the temporal filtering can be motion-compensated threshold blur filtering. For example, the ARF can be a reduced-in-size copy of the selected frame. Other techniques can be used to obtain an ARF frome one or more selected frames.

Implementations according to this disclosure result in several advantages in video coding including 1) low-complexity algorithms/techniques that rely on first-pass encoding statistics for determining an optimal coding structure; 2) whereas traditional GOP structure adaptivity may only rely on scene adaptation, the techniques herein consider the actual contribution of each frame to rate-distortion efficiency as a reference frame candidate; 3) fast and systematic ways to determine efficient (single-layer or multi-layer) coding structures; 4) suitability for hardware encoder implementation when only simple frame-level statistics are available; and 5) adaptivity to any lookahead window (depending on software/hardware memory constraint and application latency requirement) so that a full encoding of a video sequence is not required in a first-pass encoding.

Further details of adaptive GOP structure using temporal dependencies likelihood are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
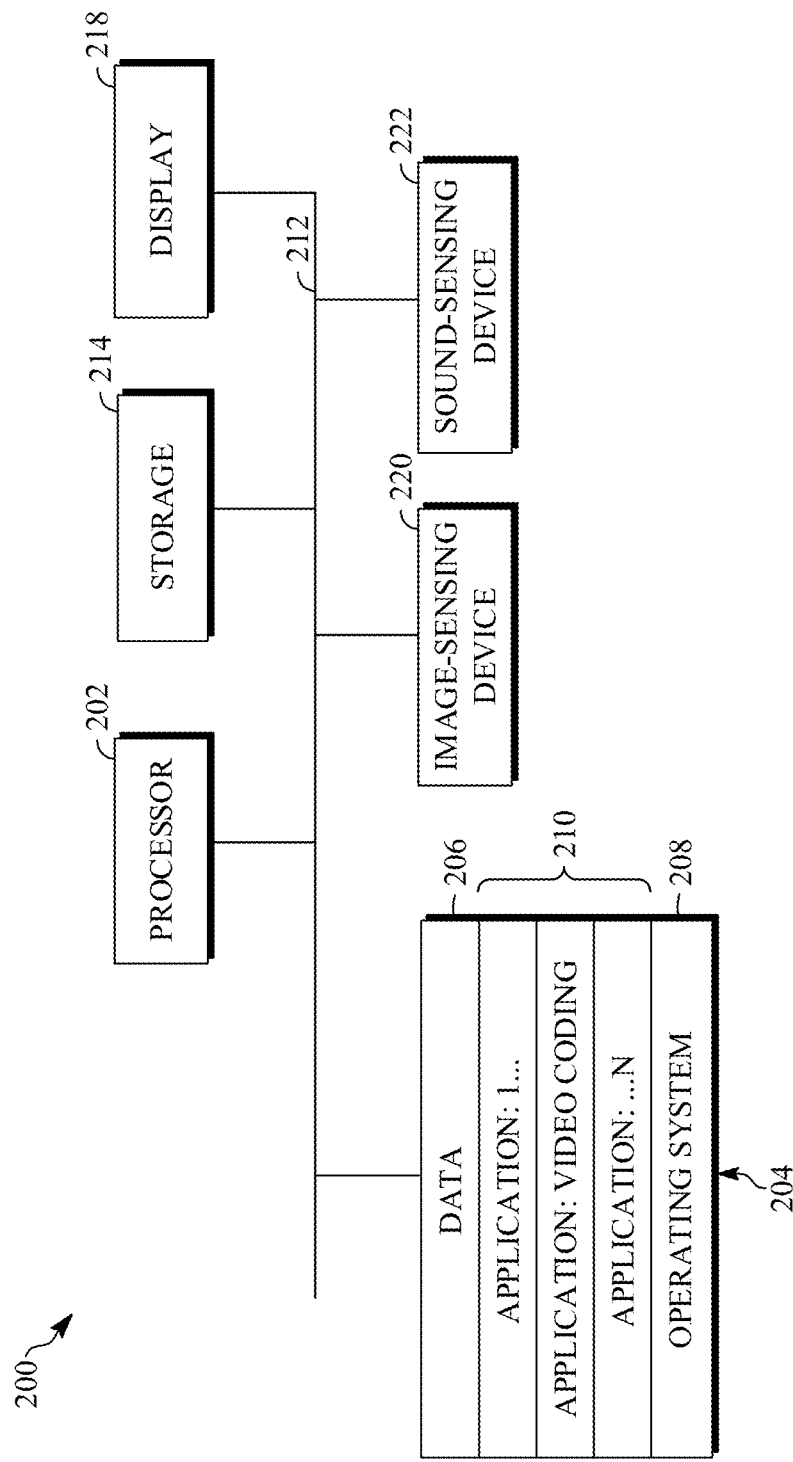
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol-based (HTTP-based) video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
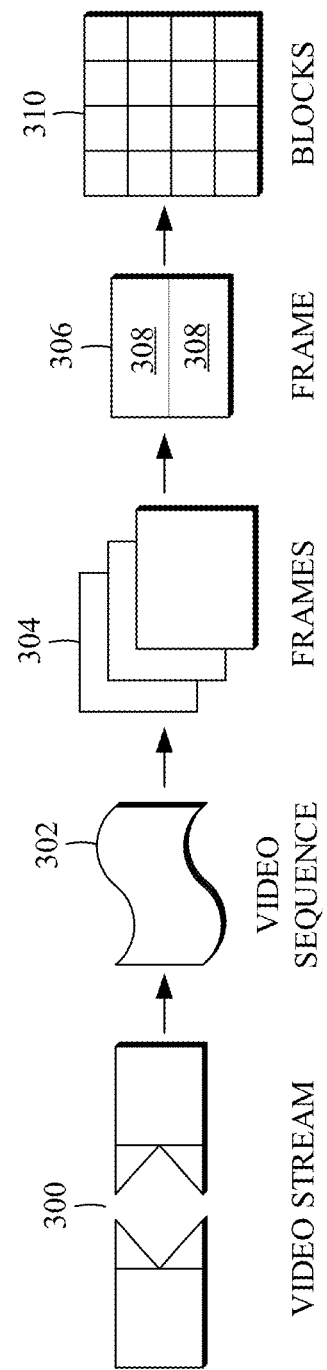
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
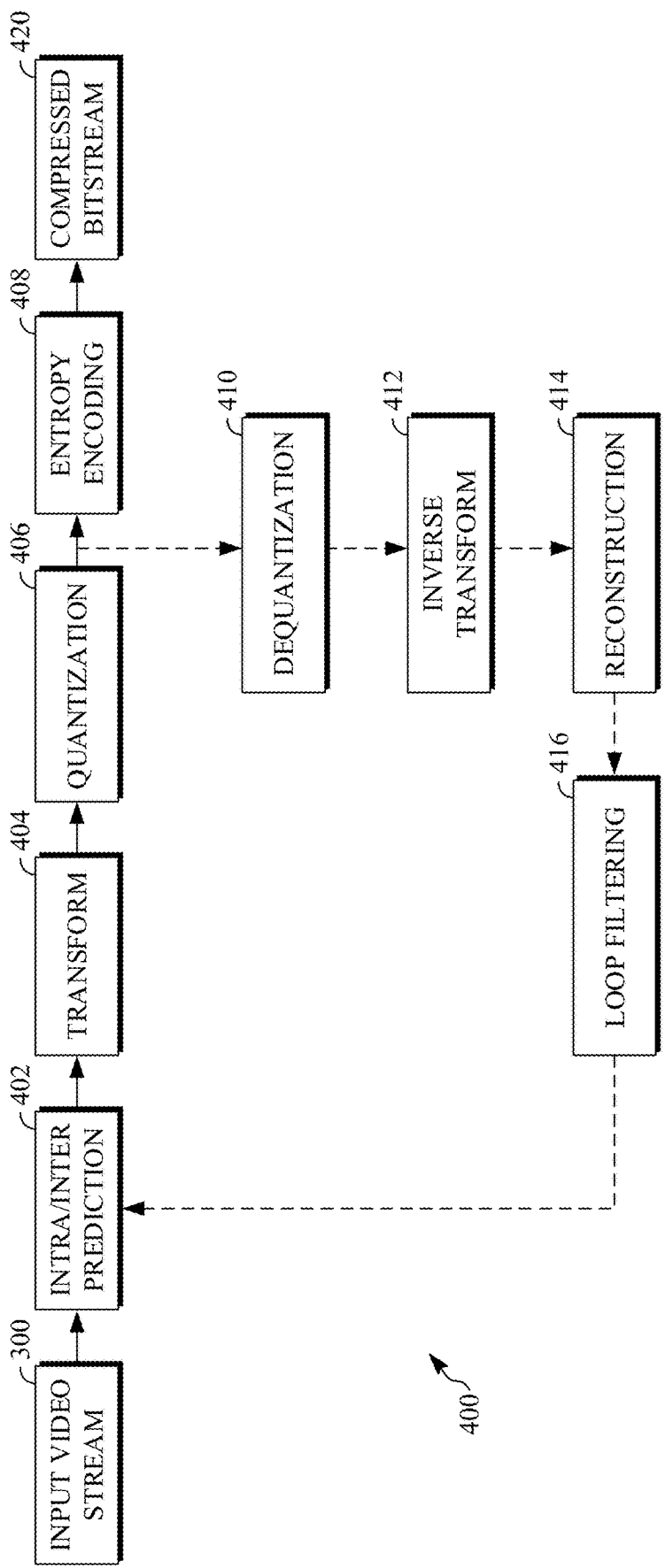
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using warped motion compensation to project pixels of a current block to a warped patch of a reference frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
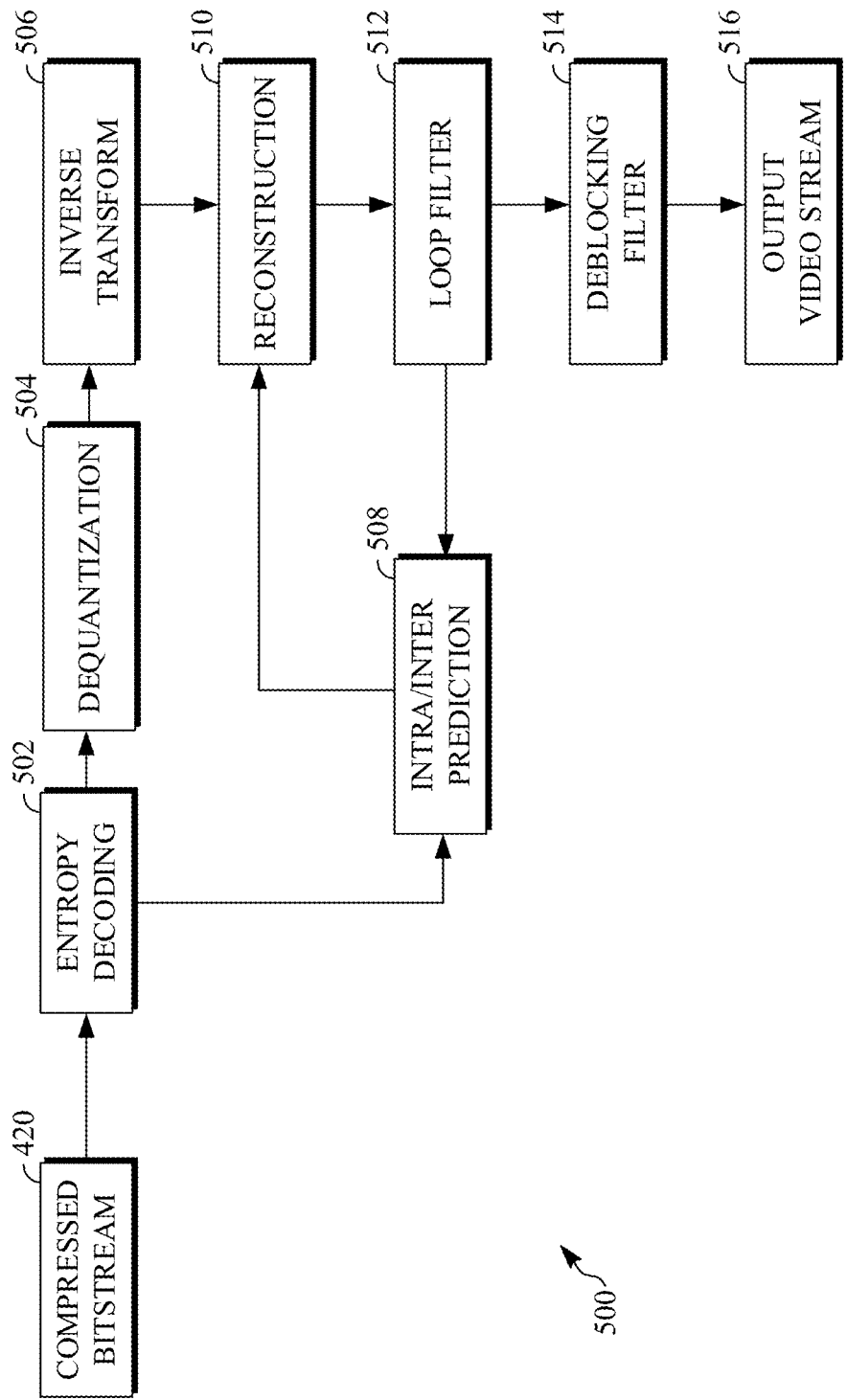
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoded 400 are discussed below with respect to FIGS. 6, 7, and 8, for example, using warped motion compensation to project pixels of a current block to a warped patch of a reference frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

As mentioned above, a frame of a GOP can be coded using one or more available reference frames. More specifically, for example, some blocks of the frame can use one reference frame while other blocks can use other reference frames. A set of available reference frames for coding a frame can be stored in a reference frame buffer.

Figure 6:
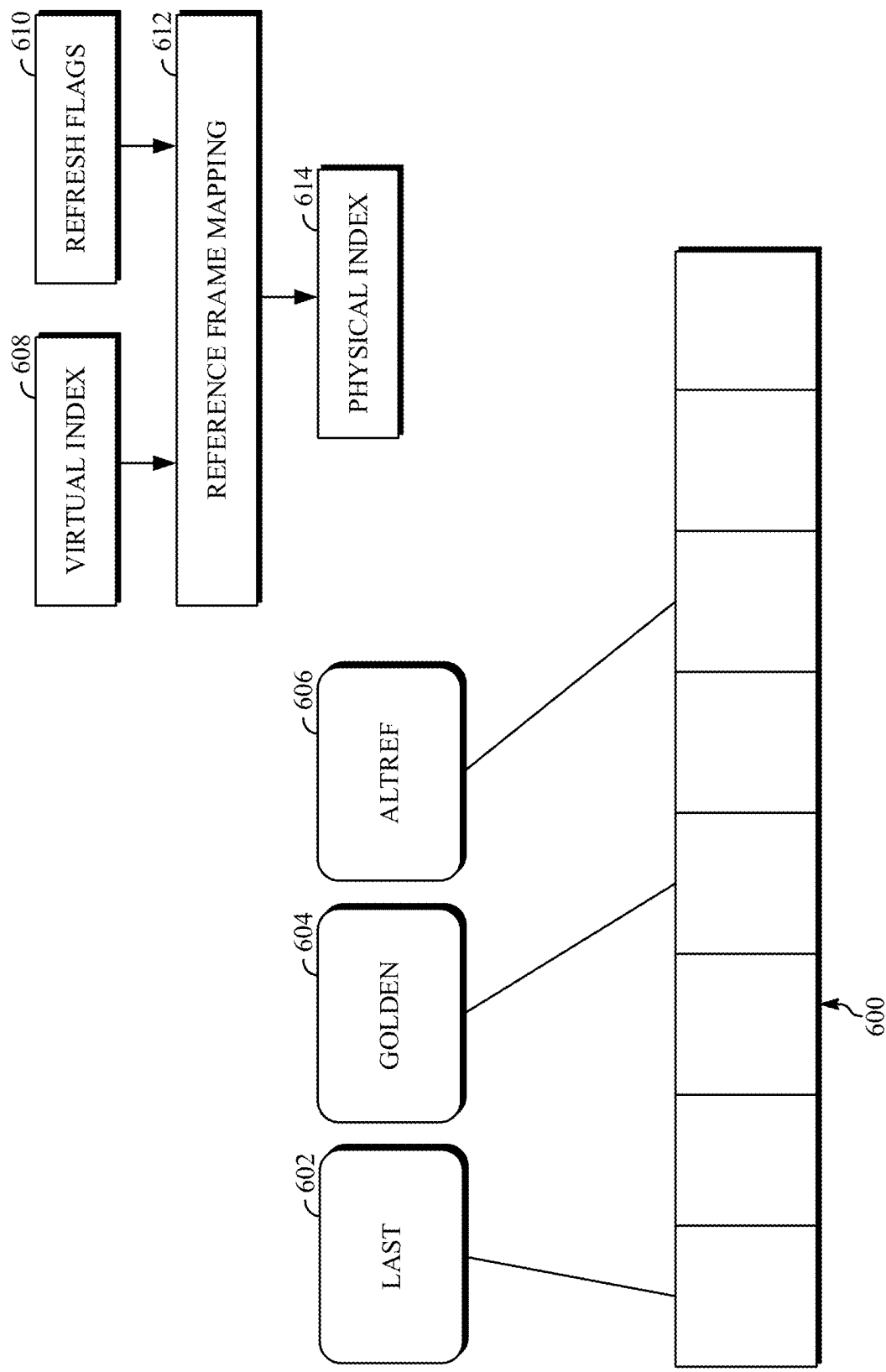
FIG. 6 is a block diagram of an example of a reference frame buffer.

FIG. 6 is a block diagram of an example of a reference frame buffer 600. The reference frame buffer 600 stores reference frames used to encode or decode blocks of frames of a video sequence. Labels and/or roles may be associated with or used to describe different reference frames stored in the reference frame buffer. The reference frame buffer 600 is provided as an illustration and operation of a reference frame buffer and implementations according to this disclosure may not result in reference frames as described with respect to FIG. 6.

The reference frame buffer 600 includes a last frame LAST 602, a golden frame GOLDEN 604, and an alternative reference frame ALTREF 606. The frame header of a reference frame can include a virtual index 608 to a location within the reference frame buffer 600 at which the reference frame is stored. A reference frame mapping 612 can map the virtual index 608 of a reference frame to a physical index 614 of memory at which the reference frame is stored. Where two reference frames are the same frame, those reference frames can have the same physical index even if they have different virtual indexes. One or more refresh flags 610 can be used to remove one or more of the stored reference frames from the reference frame buffer 600, for example, to clear space in the reference frame buffer 600 for new reference frames, where there are no further blocks to encode or decode using the stored reference frames, or where a new golden frame is encoded or decoded.

The reference frames stored in the reference frame buffer 600 can be used to identify motion vectors for predicting blocks of frames to be encoded or decoded. Different reference frames may be used depending on the type of prediction used to predict a current block of a current frame. For example, in an inter-inter compound prediction, blocks of the current frame can be forward predicted using any combination of the last frame LAST 602, the golden frame GOLDEN 604, and the alternative reference frame ALTREF 606.

There may be a finite number of reference frames that can be stored within the reference frame buffer 600. As shown in FIG. 6, the reference frame buffer 600 can store up to eight reference frames. Each of the stored reference frames can be associated with a respective virtual index 608 of the reference frame buffer. Although three of the eight spaces in the reference frame buffer 600 are used by the last frame LAST 602, the golden frame GOLDEN 604, and the alternative reference frame ALTREF 606, five spaces remain available to store other reference frames.

In particular, one or more available spaces in the reference frame buffer 600 may be used to store additional alternative reference frames (e.g., ALTREF1, ALTREF2, EXTRA ALTREF, etc., wherein the original alternative reference frame ALTREF 606 could be referred to as ALTREF0). The alternative reference frame ALTREF 606 is a frame of a video sequence that is distant from a current frame in a display order, but is encoded or decoded earlier than it is displayed. For example, the alternative reference frame ALTREF 606 may be ten, twelve, or more (or fewer) frames after the current frame in a display order.

The additional alternative reference frames can be frames located nearer to the current frame in the display order. For example, a first additional alternative reference frame, ALTREF2, can be five or six frames after the current frame in the display order, whereas a second additional alternative reference frame, ALTREF3, can be three or four frames after the current frame in the display order. Being closer to the current frame in display order increases the likelihood of the features of a reference frame being more similar to those of the current frame. As such, one of the additional alternative reference frames can be stored in the reference frame buffer 600 as additional options usable for backward prediction.

Although the reference frame buffer 600 is shown as being able to store up to eight reference frames, other implementations of the reference frame buffer 600 may be able to store additional or fewer reference frames. Furthermore, the available spaces in the reference frame buffer 600 may be used to store frames other than additional alternative reference frames. For example, the available spaces may store a second last frame LAST2 and/or a third last frame LAST3 as additional forward prediction reference frames. In another example, a backward frame BWDREF may be stored as an additional backward prediction reference frame.

As mentioned above, the frames of a GOP may be coded in a coding order that is different from the display order of the frames. For example, an encoder may receive the frames in the display order, determine a coding order (or a coding structure), and encode the group of frames accordingly. For example, a decoder may receive the frames (e.g., in an encoded bitstream) in the coding order, decode the frames in the coding order, and display the frames in the display order. As frames are coded (i.e., encoded by an encoder or decoded by a decoder), they may be added to the reference frame buffer 600 and assigned different roles (e.g., LAST, GOLDEN, ALTREF, LAST2, LAST3, BWDREF, etc.) for the coding of a subsequent frame. That is, some frames that are coded first may be stored in the reference frame buffer 600 and used as reference frames for the coding (using inter-prediction) of other frames. For example, the first frame of a GOP may be coded first and assigned as a GOLDEN frame, and the last frame within a GOP may be coded second, assigned as an alternative reference (i.e., ALTREF) for the coding of all the other frames.

The frames of a GOP can be encoded using a coding structure. A coding structure, as used herein, refers to the order of coding of the frames of the GF group and/or which reference frames are available for coding which other frames of the GOP. To illustrate the concept of coding structures, and without loss of generality or without any limitations as to the present disclosure, a multi-layer coding structure and a one-layer coding structure are described below with respect to FIGS. 7A-7B, respectively. It is noted that, when referring to an encoder, coding means encoding; and when referring to a decoder, coding means decoding.

The frames of a GF group may be coded independently of the frames of other GF groups. In the general case, the first frame of the GF group is coded using intra prediction and all other frames of the GF group are coded using frames of the GF group as reference fames. In some cases, the first frame of the GF group can be coded using frames of a previous GF group. In some cases, the last frame of the GF group can be coded using frames of a previous GF group. In some cases, the first and the last frame of a GF group may be coded using frames of prior GF groups.

In an example, three reference frames may be available to encode or decode blocks of other frames of the video sequence. The first reference frame may be an intra-predicted frame, which may be referred to as a key frame or a golden frame. In some coding structures, the second reference frame may be a most recently encoded or decoded frame. The most recently encoded or decoded frame may be referred to as the LAST frame. The third reference frame may be an alternative reference frame that is encoded or decoded before most other frames, but which is displayed after most frames in an output bitstream. The alternative reference frame may be referred to as the ALTREF frame. The efficacy of a reference frame when used to encode or decode a block can be measured based on the resulting signal-to-noise ratio.

FIG. 7A is a diagram of an example of a multi-layer coding structure 720 according to implementations of this disclosure. The multi-layer coding structure 720 shows a coding structure of a GF group of length 10 (i.e., the group of frames includes 10 frames): frames 700-718.

An encoder, such as the encoder 400 of FIG. 4, can encode a group of frames according to the multi-layer coding structure 720. A decoder, such as the decoder 500 of FIG. 5, can decode the group of frames using the multi-layer coding structure 720. The decoder can receive an encoded bitstream, such as the compressed bitstream 420 of FIG. 5. In the encoded bitstream, the frames of the group of frames can be ordered (e.g., sequenced, stored, etc.) in the coding order of the multi-layer coding structure 720. The decoder can decode the frames in the multi-layer coding structure 720 and display them in their display order. The encoded bitstream can include syntax elements that can be used by the decoder to determine the display order.

The numbered boxes of FIG. 7A indicate the coding order of the group of frames. As such, the coding order is given by the frame order: 700, 702, 704, 706, 708, 710, 712, 714, 716, and 718. The display order of the frames of the group of frames in indicated by the left-to-right order of the frames. As such, the display order is given by the frame order: 700, 708, 706, 710, 704, 716, 714, 718, 712, and 702. That is, for example, the second frame in the display order (i.e., the frame 708) is the $5^{th}$ frame to be coded; the last frame of the group of frames (i.e., the frame 702) is the second frame to be coded.

In FIG. 7A, the first layer includes the frames 700 and 702, the second layer includes the frames 704 and 712, the third layer includes the frames 706 and 714, and the fourth layer includes the frames 708, 710, 716, and 718. The frames of a layer do not necessarily correspond to the coding order. For example, while the frame 712 (corresponding to coding order 7) is in the second layer, frame 706 (corresponding to coding order 4) of the third layer and frame 708 (corresponding to coding order 5) of the fourth layer are coded before the frame 712.

In a multi-layer coding structure, such as the multi-layer coding structure 720, the frames within a GF group may be coded out of their display order and the coded frames can be used as backward references for frames in different (i.e., higher) layers.

The coding structure of FIG. 7A is said to be a multi-layer coding structure because frames of a layer are coded using, as reference frames, only coded frames of lower layers and coded frames of the same layer. That is, at least some frames of lower layers and frames of the same layer of a current frame (i.e., a frame being encoded) can be used as reference frames for the current frame. A coded frame of the same layer as the current frame is a frame of the same layer as the current frame and is coded before the current frame. For example, the frame 712 (coding order 7) can be coded using frames of the first layer (i.e., the frames 700 and 702) and coded frames of the same layer (i.e., the frame 704). As another example, the frame 710 (coding order 6) can be coded using already coded frames of the first layer (i.e., the frames 700 and 702), already coded frames of the second layer (i.e., the frame 704), already coded frames of the third layer (i.e., the frame 706), and already coded frames of the same layer (i.e., the frame 708). Which frames are actually used to code a frame depends on the roles assigned to the frames in the reference frame buffer.

The arrows in FIGS. 7A-7B illustrate partial examples of which frames can be used, as reference frames, for coding a frame. For example, as indicated by the arrows, the frame 700 can be used to code the frame 702, the frames 700 and 702 can be used to code the frame 704, and so on. However, as already mentioned, for the sake of reducing clutter, only a subset of the possible arrows is displayed. For example, as indicated above, the frames 700 and 702 can be used for coding any other frame of the group of frames; however, no arrows are illustrated, for example, between the frames 700 and/or 702 and the frames 710, 716, 718, etc.

In an implementation, the number of layers and the coding order of the frames of the group of frames can be selected by an encoder based on the length of the group of frames. For example, if the group of frames includes 10 frames, then the multi-layer coding structure of FIG. 7A can be used. In another example, if the group of frames includes nine (9) frames, then the coding order can be frames 1, 9, 8, 7, 6, 5, 4, 3, and 2. That is, for example, the $3^{rd}$ frame in the display order is the coded $8^{th}$ in the coding order. A first layer can include the $1^{st}$ and $9^{th}$ frames in the display order, a second layer can include the $5^{th}$ frame in the display order, a third layer can include the $3^{rd}$ and $7^{th}$ frames in the display order, and a fourth layer can include the $2^{nd}$, $4^{th}$, $6^{th}$, and $8^{th}$ frames in the display order.

As mentioned above, the coding order for each group of frames can differ from the display order. This allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference frame buffer (e.g., a last frame, an alternative reference frame, etc.) and defines or indicates the coding order for the frames within a group.

In a multi-layer coding structure, the first frame and last frame (in display order) are coded first. As such, the frame 700 (the first in display order) is coded first and the frame 702 (the last in display order) is coded next. The first frame of the group of frames can be referred as (i.e., has the role of) the GOLDEN frame such as described with respect to the golden frame GOLDEN 604 of FIG. 6. The last frame in the display order (e.g., the frame 702) can be referred to as (i.e., has the role of) the ALTREF frame, as described with respect to the alternative reference frame ALTREF 606 of FIG. 6.

In coding blocks of each of the frames 704-718, the frame 700 (as the golden frame) is available as a forward prediction frame and the frame 702 (as the alternative reference frame) is available as a backward reference frame. Further, the reference frame buffer, such as the reference frame buffer 600, is updated after coding each frame so as to update the identification of the reference frame, also called a last frame (e.g., LAST), which is available as a forward prediction frame in a similar manner as the frame 700. For example, when blocks of the frame 706 are being predicted (e.g., at the intra/inter prediction stage 402), the frame 708 can be designated the last frame (LAST), such as the last frame LAST 602 in the reference frame buffer 600. When blocks of the frame 708 are being predicted, the frame 706 is designated the last frame, replacing the frame 704 as the last frame in the reference frame buffer. This process continues for the prediction of the remaining frames of the group in the encoding order.

The first frame can be encoded using inter- or intra-prediction. In the case of inter-prediction, the first frame can be encoded using frames of a previous GF group. The last frame can be encoded using intra- or inter-prediction. In the case of inter-prediction, the last frame can be encoded using the first frame (e.g., the frame 700) as indicated by the arrow 719. In some implementations, the last frame can be encoded using frames of a previous GF group. All other frames (i.e., the frames 704-718) of the group of frames are encoded using encoded frames of the group of frames as described above.

The GOLDEN frame (i.e., the frame 700) can be used as a forward reference and the ALTREF (i.e., the frame 702) can be used as a backward reference for coding the frames 704-718. As every other frame of the group of frames (i.e., the frames 704-718) has available at least one past frame (e.g., the frame 700) and at least one future frame (e.g., the frame 702), it is possible to code a frame (i.e., to code at least some blocks of the frame) using one reference or two references (e.g., inter-inter compound prediction).

In a multi-layer coding structure, some of the layers can be assigned roles. For example, the second layer (i.e., the layer that includes the frames 704 and 712) can be referred to as the EXTRA ALTREF layer, and the third layer (i.e., the layer that includes the frames 706 and 714) can be referred to as the BWDREF layer. The frames of the EXTRA ALTREF layer can be used as additional alternative prediction reference frames. The frames of the BWDREF layer can be used as additional backward prediction reference frames. If a GF group is categorized as a non-still GF group (i.e., when a multi-layer coding structure is used), BWDREF frames and EXTRA ALTREF frames can be used to improve the coding performance.

FIG. 7B is a diagram of an example of a one-layer coding structure 750 according to implementations of this disclosure. The one-layer coding structure 750 can be used to code a group of frames.

An encoder, such as the encoder 400 of FIG. 4, can encode a group of frames according to the one-layer coding structure 750. A decoder, such as the decoder 500 of FIG. 5, can decode the group of frames using the one-layer coding structure 750. The decoder can receive an encoded bitstream, such as the compressed bitstream 420 of FIG. 5. In the encoded bitstream, the frames of the group of frames can be ordered (e.g., sequenced, stored, etc.) in the coding order of the one-layer coding structure 750. The decoder can decode the frames in the one-layer coding structure 750 and display them in their display order. The encoded bitstream can include syntax elements that can be used by the decoder to determine the display order.

The display order of the group of frames of FIG. 7B is given by the left-to-right ordering of the frames. As such, the display order is 752, 754, 756, 758, 760, 762, 764, 766, 768, and 770. The numbers in the boxes indicate the coding order of the frames. As such, the coding is 752, 770, 754, 756, 758, 760, 762, 764, 766, and 768.

To code any of the frames 754, 756, 758, 760, 762, 764, 766, and 768 in the one-layer coding structure 750, except for the distant ALTREF frame (e.g., the frame 770), no other backward reference frames are used. Additionally, in the one-layer coding structure 750, the use of the BWDREF layer (as described with respect to FIG. 7A), the EXTRA ALTREF layer (as described with respect to FIG. 7A), or both is disabled. That is, no BWDREF and/or EXTRA ALTREF reference frames are available for coding any of the frames 754-768. Multiple references can be employed for the coding of the frames 754-768. Namely, the reference frames LAST, LAST2, LAST3, and GOLDEN, coupled with the use of the distant ALTREF, can be used to encode a frame. For example, the frames 752 (GOLDEN), the frame 760 (LAST3), the frame 762 (LAST2), the frame 764 (LAST), and the frame 770 (ALTREF) can be available in the reference frame buffer, such as the reference frame buffer 600, for coding the frame 766.

As eluded to above, the encoding structure can be performed within a rate-control lookahead window. As is known, two-pass or multi-pass encoding can provide higher compression than single pass encoding. In the encoding first pass, information (e.g., statistics) are gathered about the characteristics of the video sequence, that is, the series of source frames or images. For performance (e.g., speed) reasons, simple encoding modes can be used in the first pass. For example, blocks can be encoded in one of two ways: a simple DC predicted intra mode (or a limited number of intra-prediction modes) or an inter mode that uses a motion vector that refers to the previous frame reconstruction buffer (e.g., the reconstructed preceding frame in display order). Additionally, in the case of inter-prediction, only grid-aligned reference blocks may be used so that sub-pixel interpolations are avoided.

The first pass encoding is typically performed over a lookahead window, which includes a number of frames. More specifically, the encoding statistics are computed over the frames of the lookahead window. Said yet another way, the lookahead window is the number of frames that the encoder uses in a first encoding pass to gather statistics to be used in making encoding decisions in, for example, a second pass encoding. The size of the lookahead window is typically much smaller than the size (in frames) of the video sequence itself. While the video sequence is encoded in GOPs in a compressed bitstream, such as the compressed bitstream 420 of FIG. 4, the concept of lookahead window is orthogonal to that of GOP. The size of the lookahead window may be smaller, larger, or the same as that of a GOP. For example the lookahead window may be 200 frames while the GOP size may be 8 frames, or vice versa. In an example, the size of the lookahead window can be equal or greater than that of the GOP.

Figure 8:
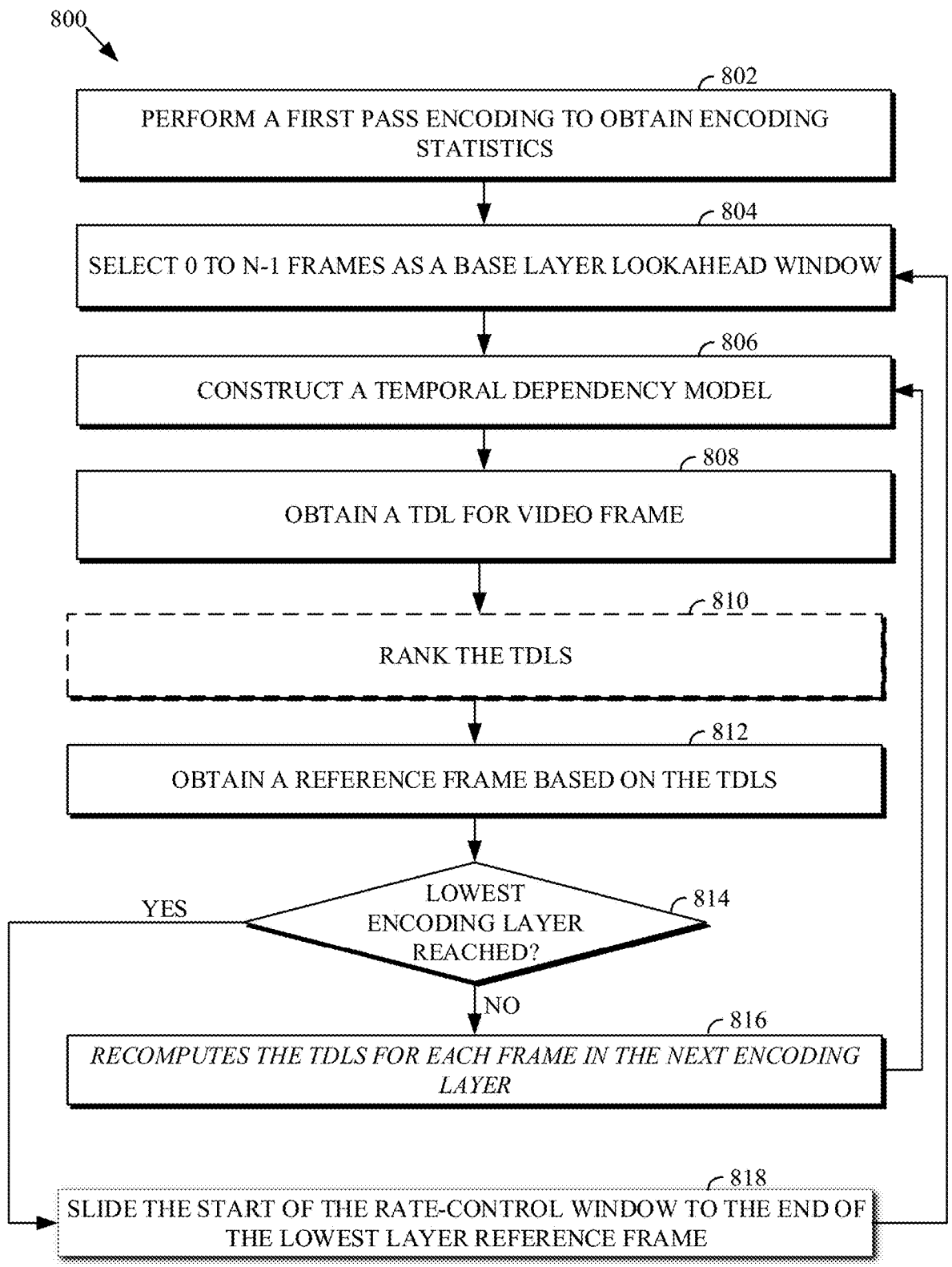
FIG. 8 is a flowchart diagram of a technique for determining a coding structure of a group of pictures (GOP) that includes frames of a video according to an implementation of this disclosure.

FIG. 8 is a flowchart diagram of a technique 800 for determining a coding structure of a group of pictures (GOP) that includes frames of a video according to an implementation of this disclosure.

At 802, an encoder, such as the encoder 400 of FIG. 4, can perform a first pass encoding to obtain encoding statistics. A fixed encoding structure can be used in the first pass encoding. In an example, the fixed encoding structure can be such that each encoded frame only uses the immediately preceding frame in display order as a reference frame. In an example, the first pass encoding can be performed either offline on the entire video bitstream. In an example, the first pass encoding can be performed online within a localized (e.g., shorter than the entirety of the video sequence/stream) rate-control lookahead window about (e.g., around, proximal to, etc.) a current encoder frame position (i.e. a current encoder position).

In the case that the first pass encoding is performed offline, then a second encoder may perform the subsequent steps of the technique 800. In an example, performing the first step in an offline mode may be used in a transcoding scenario. For example, a video sequence may be received by the technique 800. The video sequence may be an already encoded video sequence. If so, then the technique 800 may decode the encoded video sequence for the purpose of re-encoding it into multiple formats. The encoding statistics collected during the offline first step encoding can then be used by the different (e.g., each of the) transcoding encoders as further described below.

At 804, 0 to N−1 frames are selected to be a base layer lookahead window, where N is the total number of frames in the base layer lookahead window. In an example, N can be 24 frames; however, other values are possible.

At 806, the technique 800 uses the encoding statistics to construct a temporal dependency model within the current prediction layer inside the lookahead window. To illustrate and without loss of generality, motion vectors, percentage of blocks predicted using the inter prediction mode, and coding errors can be at least some of the encoding statistics used to construct the temporal dependency model.

At 808, the technique 800 uses the temporal dependency model to obtain (e.g., compute, calculate, infer, etc.) a temporal dependency likelihood for each video frame. At 810, the technique 800 can rank the TDLs. In an example, ranking the TDLs, at 810, may be an implicit step in that the technique 800 may simply search for an identify the frame with the highest TDL.

At 812, the technique 800 obtains a reference frame based on the TDLs. In an example, the technique 800 can designate the frame with the highest TDL as a reference frame based on the TDLs. In an example, the technique 800 can obtain an ARF from frame with the highest TDL. In an example, the technique 800 may select two or more frames having the highest TDLs for synthesizing the ARF. In an example, the technique 800 may only select a valid frame with the highest TDL. If the frame with the highest TDL is not a valid frame, then the next valid frame with the highest TDL is selected. A frame may be invalid as a reference frame based on bitstream or other rules of a subject codec. For example, for latency reasons, a codec rule may be that an ARF cannot be constructed from a frame that is only one frame away, in display order, from the first frame of a coding layer. As such, if the frame with the highest TDL violates the rule, then a frame with the next highest TDL that does not violate the rule can be selected. In either case, the designated/selected/synthesized reference frame is used as an available reference frame in the current layer for the second pass encoding.

At 814, if the lowest encoding layer is reached, then the technique 800 proceeds to 818; otherwise the technique 800 proceeds to 816. In an example, a maximum number of encoding layers may be provided by a user executing, or causing to be executed, the technique 800. In an example, the maximum number of encoding layers may be dictated (e.g., hard coded in, etc.) the encoder.

At 816, the technique 800 recomputes the TDLs for each frame in the next encoding layer by returning to 806. More specifically, while for the sake of more rather than less detail, FIG. 8 shows that from 816 the technique 800 returns to 806, this is not to be interpreted that the technique 800 performs 816 and then performs 806-814 again. Rather, recomputing the TDLs for each candidate in the next encoding layer is by returning to 806.

At 818, the technique 800 slides the start of the rate-control window to the end of the lowest layer reference frame and returns to 804.

Figure 9:
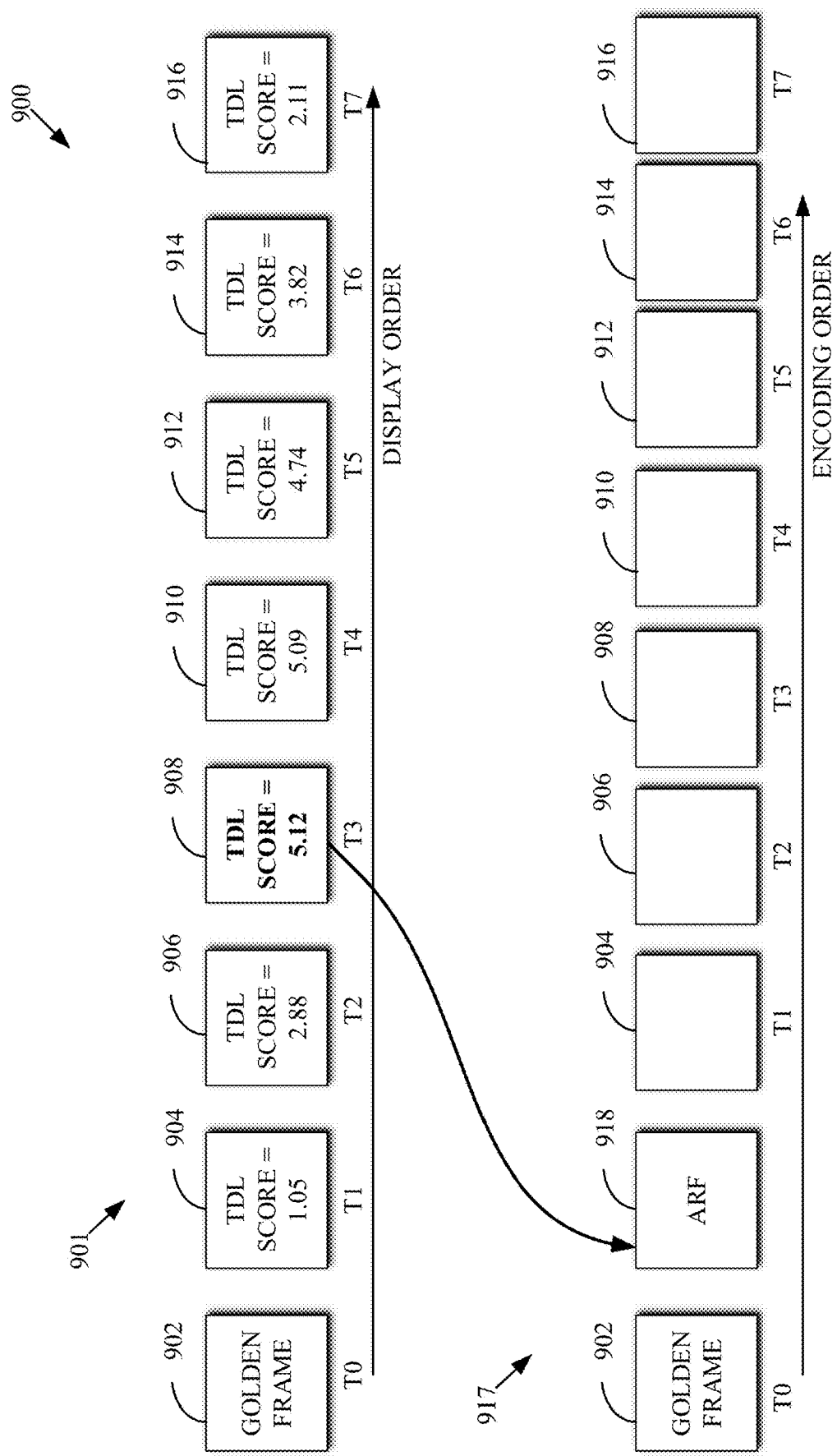
FIG. 9 is an diagram of an illustration of selecting a reference frame in a single-layer encoding structure according to implementations of this disclosure.
Figure 10A:
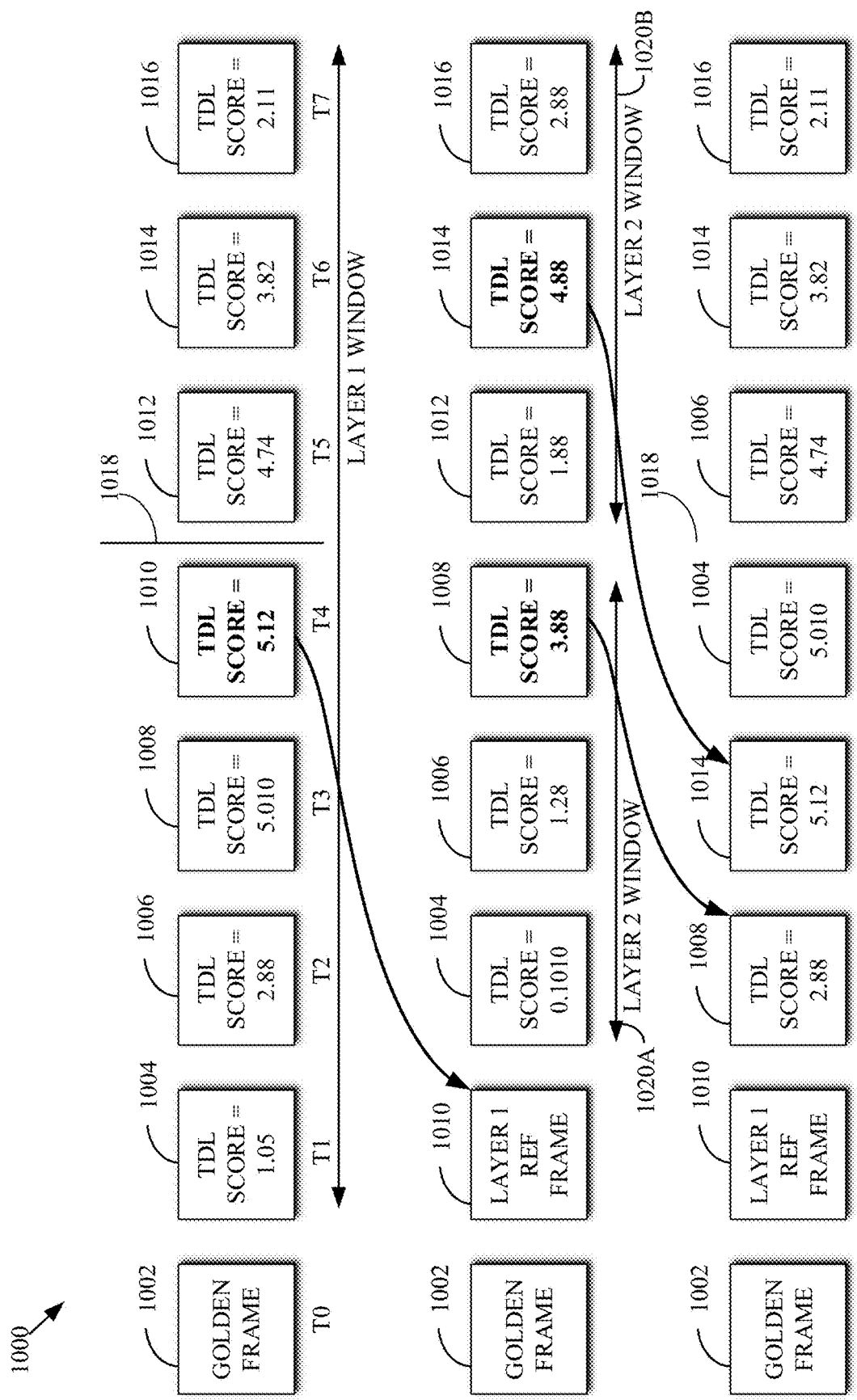
FIGS. 10A-10B are diagram of an illustration of selecting reference frames in a multi-layer encoding structure according to implementations of this disclosure.
Figure 10B:
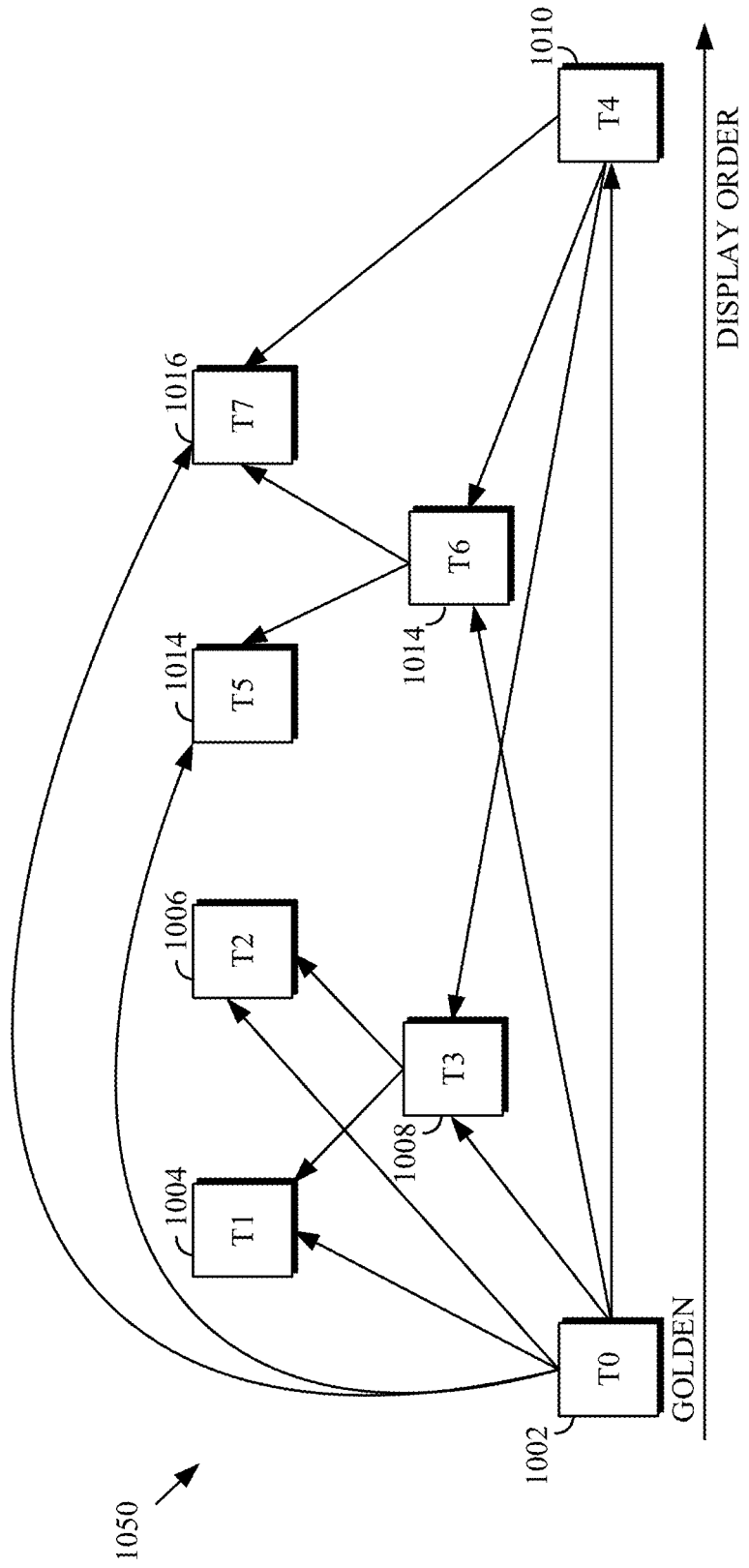

The operation of the technique 800 is described, at high level, with respect to FIGS. 9 and 10A-10B.

FIG. 9 is an diagram of an illustration 900 of selecting a reference frame in a single-layer encoding structure according to implementations of this disclosure. The illustration 900 includes a GOP 901 that includes the frames 902-916, which are shown in display order, and which are to be displayed at times T0-T7, respectively. The frame 902 is a golden frame (or an intra-predicted frame). As a golden frame, the frame 902 is an available reference frame for all other frames of the GOP 901. Using encoding statistics of a first pass encoding, at 808, the technique 800 calculates the TDLs for each of the frames 904-916 to be 1.05, 2.88, 5.12, 5.09, 4.74, 3.82, and 2.11, respectively.

At 812, the technique 800 determines that the frame 908 has the highest TDL (i.e., 5.12). Thus, the technique 800 can use the frame 908 as an available reference frame for the frames 904-906 and 910-916. Alternatively, and as shown in the illustration 900, the technique 800 obtains an ARF 918, at 812. The ARF 918 is an available reference frame for encoding the frames 904-916. Thus, the ARF 918 is encoded before the frames 904-916. Thus, the encoding order is as shown in an encoding order 917. The encoding order 917 shows that the frames that are available reference frames (namely, the frame 902 and the ARF 918) are coded before the frames 904-916, which are coded in that order.

FIG. 10A is an diagram of an illustration 1000 of selecting reference frames in a multi-layer encoding structure according to implementations of this disclosure. The illustration 1000 includes frames 1002-1016, which can be, or can be a subset of, a GOP. The first frame, the frame 1002 is a golden frame. The frames 1004-1016 can constitute the frames of lookahead window for selecting a reference frame. The frames 1002-1016 are shown in display order.

Using encoding statistics of a first pass encoding, at 808, the technique 800 calculates the TDLs for each of the frames 1004-1016 to be 1.05, 2.88, 5.010, 5.12, 4.74, 3.82, and 2.11, respectively. At 812, the technique 800 determines that the frame 1010 has the highest TDL (i.e., 5.12). Thus, the technique 800 uses the frame 1010 as an available reference frame for the frames in first encoding layer. Note that in the illustration 1000, the frame with the highest TDL is itself used as the available reference frame and that an ARF is not generated. However, as mentioned above, an ARF can be obtained in an example.

At 816, the technique 800 recomputes the TDLs for each frame in the next encoding layer. The technique 800 establishes the next encoding layer based on the frame selected (i.e., the frame 1010). The next encoding layer splits the frames at a location 1018, which is after the frame 1008 in the sequence of frames, thereby forming a first second encoding layer window 1020A and a second second encoding layer window 1020B. The first second encoding layer window 1020A includes the frames 1004-1008 and the second second encoding layer window 1020B includes the frames 1012-1016.

Each of the first second encoding layer window 1020A and the second second encoding layer window 1020B is then separately processed by the technique 800, as described above. Thus, TDLs are obtained for each of the frames 1004-1008 and TDLs are obtained for each of the frames 1012-1016. As the frame 1008 has the highest TDL in the first second encoding layer window 1020A, it is selected as an available reference frame in the second layer; and as the frame 1014 has the highest TDL in the second second encoding layer window 1020B, it is also selected as an available reference frame in the second layer.

Based on the above, the frames 1002, 1010, 1008, and 1014 are encoded before the remaining frames. FIG. 10B graphically depicts the two-layer encoding structure 1050 corresponding to the illustration 1000 of FIG. 10A. The labels inside the boxes of FIG. 10B, which correspond to the frames of FIG. 10A, indicate the display order (i.e., display time point) of the frames. In FIG. 10B, an arrow from a first frame to a second frame indicates that the first frame is an available reference frame for the second frame. However, for the sake of reducing clutter, only a subset of the possible arrows is displayed in FIG. 10B and a person skilled in the art can properly determine which frames are available as reference frames for encoding which other frames based on the foregoing description. As such, the frame 1002 is an available reference frame for encoding the frames 1010, 1008, 1014, 1004, 1006, 1014, and 1016; the frame 1008 is an available reference for the frames 1004 and 1006; the frame 1010 is an available reference frame for inter alia the frames 1008 and 1014; and so on.

In a first technique of obtaining the TDL of a frame, the TDL can be calculated by recursively calculating the total amount of information that the frame contributes to a given GOP. For each lookahead frame, a propagation_cost, which estimates (e.g., indicates, etc.) how much future residuals depend on the current frame, can be maintained.

For each frame, an intra-prediction cost (intra_cost) and an inter-prediction cost (inter_cost) can be calculated in the first pass encoding. The intra-prediction cost (intra_cost) can represent the impact that those blocks of the frame predicted using intra-prediction may have on subsequent frames in the sequence; and the inter-prediction cost (inter_cost) can represent the impact that those blocks of the frame predicted using inter-prediction may have on subsequent frames in the sequence. The impacts (i.e., intra_cost and inter_cost) can be calculated (estimated) based on the residual errors associated with the blocks of the frame.

In an example, the impacts (i.e., intra_cost and inter_cost) can be estimated based on the sum of absolute transform (e.g., Hadamard transform) differences (SATD). However, other suitable error measures, such as the sum of absolute differences (SAD), the mean square error (MSE), or another error measure, can also be used.

The propagation_cost for a frame i can be computed as:

$$\text{propagation\_cost}(i) = \text{area\_ratio\_used\_for\_reference}(i) \times L(i+1)$$

In the above formula, (i+1) refers to the direct child frame dependency of frame i since, in the first pass encoding, the frame (i+1) can be predicted from the immediately preceding frame, as described above. $L(i+1)$ is the TDL of frame (i+1) and will be further described below. The value area_ratio_used_for reference refers to the portion of a frame that is used for inter prediction. That is, area_ratio_used_for reference measures the number of blocks (or pixels) of a frame, as a fraction of the total number of blocks (or pixels), that are used as inter predictors by the succeeding frame.

A progatation_fraction can indicate the fraction of information from a frame to its reference frames. That is, the propagation_fraction can reflect the percentage of prediction error reduction associated with the motion compensated reference. The progatation_fraction can be calculated using the formula:

$$\text{progatation\_fraction} = 1 - \min(\text{intra\_cost}, \text{inter\_cost})$$

The propagation_fraction is aimed at predicting the likelihood that a frame would become an inter frame (e.g. an available reference frame). With the above formula, if the inter_cost is much lower than the intra_cost, then there is a high likelihood that more information will propagate and the frame should be used as an available reference frame. The "min" function is used so that the calculated propagation_fraction is a value between 0 and 1.

The TDL of a frame ($L(i)$) measures the amount of information propagated toward the reference blocks. For example, as more and more blocks of a frame (i+1) use blocks of frame i for inter-prediction, the TDL, $L(i)$, of frame i increases. That is, the likelihood of using frame i as a reference frame for the encoding layer increases. The likelihood is back-propagated from the child encoded frames to a frame. The TDL of frame i, $L(i)$, can be calculated using one of the formulae:

$$L(i) = [\text{intra\_cost}(i) + \text{area\_ratio\_used\_for\_reference}(i)] \times L(i+1) \times \text{propagation\_fraction}(i)$$

or $$L(i)=[\text{intra\_cost}(i)+\text{propagation\_cost}(i)] \times \text{progatation\_fraction}(i)$$

As mentioned above, some blocks may be predicted using compound prediction, if compound prediction were to be available (e.g., enabled) in the first pass encoding. In some examples, the propagation_cost may be adjusted according to the compound prediction weights by tracing a block's dependencies.

For example, in the case of inter-inter compound prediction, where two prediction blocks are combined, a reference frame may have one or more direct dependent frames (child frames). In this case, the propagation_cost can be calculated by summing up the weighted contribution of the dependencies using the following formula:

propagation_cost

=(area_ratio_used_for_reference_child_1[*i*])

*average_compound_weight_child_1[*i*]*L(child_1)

+(area_ratio_used_for_reference_child_2[*i*])

*average_compound_weight_child_2[*i*]*L(child_2)

+ . . . +(area_ratio_used_for_reference_child_*n*[*i*])

*average_compound_weight_child_*n*[*i*]*L(child_*n*)

In the above formula, area_ratio_used_for_reference_child_n[i] is the area used by child n as a reference in frame i; and average_compound_weight_child_1[i] and average_compound_weight_child_2[i] are the average weights of all inter predictions used by child i when using frame i as reference.

For example, in the case of inter-intra predicted blocks, calculating the propagation_cost may depend on how intra_cost and inter_cost are calculated. For example, if the error (e.g., the SATD) already accounts for the compound mode, no further adjustment to the propagation_cost may be necessary. On the other hand, the TDL can be multiplied by the weight used for the inter-predictor (weight_inter) as in the following formula (it is noted that for purposes of simplification, it is assumed that all inter-intra predictions use the same weights):

$$L(i)=[\text{intra\_cost}(i)+\text{weight\_inter} \times \text{progation\_cost}] \times \text{progation\_fraction}(i)$$

A second technique of obtaining the TDL of a frame modifies the first technique for low-latency applications with no lookahead windows. The temporal dependency likelihoods can be calculated by using past frames only. If a temporal dependency likelihood exceeds a certain threshold, a reference frame can be forcefully inserted.

A third technique of obtaining TDLs can use a simplified (e.g., low-complexity) temporal dependency model. In an example, the third technique can be used by encoders that lack access to internal encoder states (such as motion vectors, SATD, and other block level information) and/or where such information is not available. For example, design constraints on a hardware encoder may limit the amount of information available to the frame selection and rate control model.

In an example, the low-complexity temporal dependency model can utilize frame-level statistics. For example, the frame-level statistics can be, or can include, the number or the percentage of blocks used for inter prediction.

Figure 11:
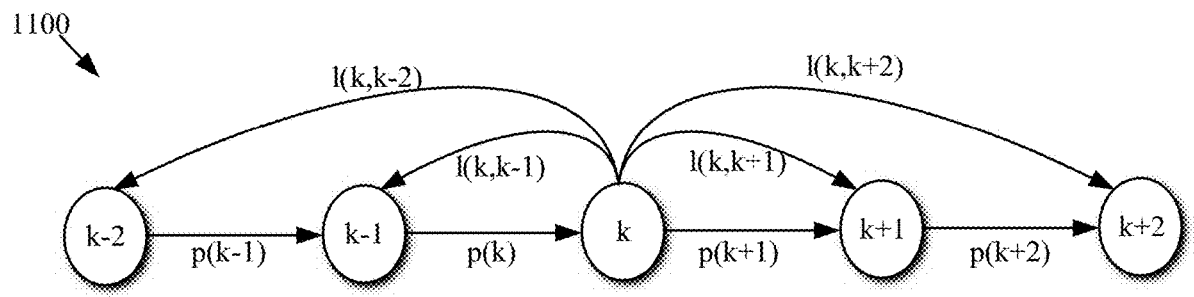
FIG. 11 is a diagram of an example of a graphical model for temporal dependency according to an implementation of this disclosure.

FIG. 11 is a diagram 1100 of an example of a graphical model for temporal dependency according to an implementation of this disclosure. The diagram 1100 includes five frames (frames k−2 to k+2) of a rate-control (RC) lookahead window. However, the disclosure is not so limited and the lookahead window can include any number of frames. In the diagram 1100, p(n) can represent a temporal correlation between a frame n and its reference frame (i.e., frame (n−1)); l(k, t) can represent the likelihood that frame k has temporal dependencies with/on frame t; R is the number of frames in the lookahead window; and L(k) represents the TDL for frame k. The following formula can be used to calculate the TDL, L(k), for frame k:

$$L(k) = \sum_{t=0, t \neq k}^{R} l(k, t),$$

$$\text{where } l(k, t) = \begin{cases} \prod_{n=t+1}^{k} p(n) & \text{if } t < k \\ \prod_{n=k+1}^{t} p(n) & \text{if } t \geq k \end{cases}$$

Table I is an example of a pseudo-code that can be used with for the third technique. The pseudo-code of Table I can be used to calculate the TDLs of at least some frames of a GOP, which can be the frames of a look-ahead window.

TABLE I

| | |
|---|---|
| 1 | for t = 1 to N−1 in RC lookahead window |
| 2 | Update p(t) |
| 3 | Set L(t) = 0 for all frames |
| 4 | for each frame t in RC lookahead window |
| 5 | for i = 1 to t |
| 6 | L_ij = 1 |
| 7 | for j = i to t |
| 8 | L_ij *= p(j) |
| 9 | L(t) += L_ij |
| 10 | for j = t+1 to N−1 |
| 11 | L_ij = 1 |
| 12 | for j = t+1 to i |
| 13 | L_ij *= p(j) |
| 14 | L(t) += L_ij |

In Table I, the index t=0 represents the first frame in the lookahead window and N represents the number of frames in the lookahead window. At rows 1-2 of Table I, the first order correlations, p(t), between frame t and frame (t−1) are calculated. As frames are added to and removed from the lookahead window, correlations of the new frames are calculated and correlations that may have been calculated in a previous lookahead window are re-used.

In rows 4-14 of Table I, the temporal dependency likelihoods of the frames of the lookahead window are calculated. The TDL of a frame is calculated by summing the backward contributions (in rows 5-9) and the forward contributions (in rows 10-14) for the frame.

Table II illustrates another example of a pseudo-code that can also be used with the third technique. It is noted that the pseudo-codes of Table I and Table II produce the same results as those shown below.

TABLE II

| | |
|---|---|
| 1 | for t = 1 to N−1 in RC lookahead window |
| 2 | Update p(t) |

TABLE II-continued

| | |
|---|---|
| 3 | Set L(t) = 0 for all frames |
| 4 | for t = 0 to N−2 in the lookahead window |
| 5 | Set current_likelihood = 1.0 |
| 6 | for i = t down to 0 step −1 { |
| 7 | current_likelihood *= p(i+1) |
| 8 | L(i) = += current _likelihood |
| 9 | } |
| 10 | Set current likelihood = 1.0 |
| 11 | for i = t+1 to N−1 { |
| 12 | current likelihood *= p(i) |
| 13 | L(i) = += current_likelihood |
| 14 | } |

At rows 1-2 of Table II, the first order correlations, p(t), between frame t and frame (t−1) are calculated as described above with respect to Table I. The current_likelihood variable is a temporary variable that is used to accumulate the products of frame temporal correlations in the backward order (i.e., in rows 5-9) and the forward order (i.e., in rows 10-13). L(i) represents the TDL of a frame i.

Given 6 frames, indexed from 0 to 5, in the lookahead window, the above formula corresponding to the graphical model of FIG. 11 and the pseudo-codes of Table I and Table II result in the following for L(0)-L(5):

$$L(0)=[p(1)]+[p(1)*p(2)]+[p(1)*p(2)*p(3)]+[p(1)*p(2)*p(3)*p(4)]+[p(1)*p(2)*p(3)*p(4)*p(5)]$$

$$L(1)=[p(1)]+[p(2)]+[p(2)*p(3)]+[p(2)*p(3)*p(4)]+[p(2)*p(3)*p(4)*p(5)]$$

$$L(2)=[p(1)*p(2)]+[p(2)]+[p(3)]+[p(3)*p(4)]+[p(3)*p(4)*p(5)]$$

$$L(3)=[p(1)*p(2)*p(3)]+[p(2)*p(3)]+[p(3)]+[p(4)]+[p(4)*p(5)]$$

$$L(4)=[p(1)*p(2)*p(3)*p(4)]+[p(2)*p(3)*p(4)]+[p(3)*p(4)]+[p(4)]+[p(5)]$$

$$L(5)=[p(1)*p(2)*p(3)*p(4)*p(5)]+[p(2)*p(3)*p(4)*p(5)]+[p(3)*p(4)*p(5)]+[p(5)]$$

The italicized quantities correspond to the condition t<k and the backward direction in the execution of the pseudo-code of Table I; and the non-italicized quantities correspond to the condition t≥k and the forward direction in the execution of the pseudo-code of Table I.

In an example, the temporal correlation between the frame n and the frame (n−1), p(n), can be, or can be obtained (e.g., calculated, etc.) using, the percent of blocks of frame n that use inter prediction. In an example, the temporal correlation between the frame n and the frame (n−1), p(n), can be, or can be obtained using, the percent of intra-prediction blocks of frame n. In an example, pixel-wise correlations can be used to obtain the temporal correlations. Pixel-wise correlation between two blocks can be calculated in any number of ways. For example, the pixel-wise correlation can be the dot product (i.e., pixel-wise multiplication and adding the products) of the two blocks—the higher the product, the more correlated the blocks are.

In another example, a linear model (e.g., combination, etc.) of one or more of the following signals (e.g., first pass encoding statistics) can be used to obtain the temporal correlations, p(t): frame-level inter and intra cost in SATD (or in another) transform domain, motion-compensated residual energy in the pixel domain, percentage of area with motion activities, magnitude and/or angle of motion activity, similarity of motion activity, first-pass quantization parameters, first-pass number of encoded bits per frame, block mode decisions distributions, more, fewer, or other encoding statistics can be combined to obtain temporal correlations.

In another example, a non-linear model (such as neural network) can be used to obtain (e.g., estimate, infer, etc.) the temporal correlation p(t) by using one or a combination of the encoding statistics as inputs to the non-linear model. For example, to train a neural network, an exhaustive search can first be performed to identify, for a given lookahead window, which is the best reference frame that would result in the best rate-distortion performance. The best reference is then labeled as the ground truth for the training of the neural network.

Figure 12:
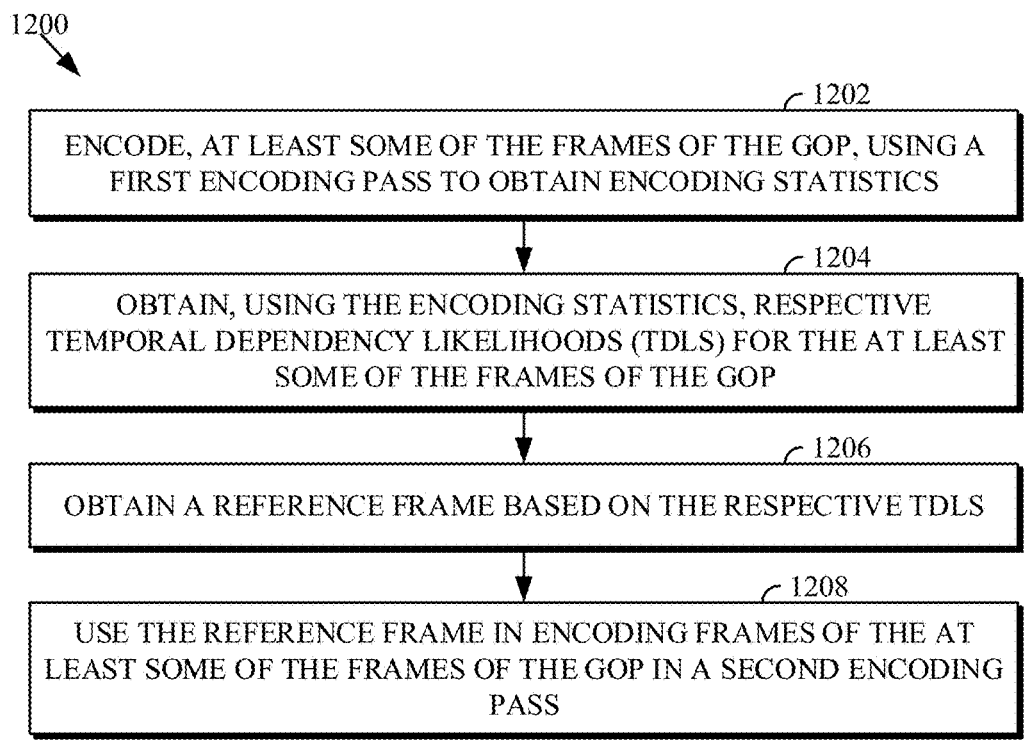
FIG. 12 is a flowchart diagram of a technique for encoding a group of pictures (GOP) that includes frames of a video according to an implementation of this disclosure.

FIG. 12 is a flowchart diagram of a technique 1200 for encoding a group of pictures (GOP) that includes frames of a video according to an implementation of this disclosure. The technique 1200 obtains (e.g., selects, chooses, identifies, determines, etc.) one or more frames of the GOP as available reference frames (or, simply, reference frames). Each of the obtained reference frames can be used as an available reference frame for encoding at least a subset of the other frames of the GOP. The technique 1200 can be, or can be used to, identify an encoding structure of the frames of the GOP. The encoding structure can be a one layer or a multi-layer coding structure. In the case of a multi-layer coding structure, each layer can have a set of available reference frames.

The technique 1200 can be implemented, for example, as a software program that may be executed by computing devices (e.g., apparatuses, etc.) such as transmitting station 102. For example, the software program can include machine-readable instructions that may be stored in a memory such as the memory 204 or the secondary storage 214, and that, when executed by a processor, such as CPU 202, may cause the computing device to perform the technique 1200. The technique 1200 can be implemented using specialized hardware or firmware. As explained above, some computing devices may have multiple memories or processors, and the operations described in the technique 1200 can be distributed using multiple processors, memories, or both. The technique 1200 can be implemented by an encoder, such as the encoder 400 of FIG. 4. The technique 1200 can be, at least partially, implemented by rate-control stage of the encoder. The technique 1200 may be at least partially implemented in an offline process that receives a video sequence (already compressed or otherwise) that transcodes the video sequence into different formats.

At 1202, the technique 1200 encodes, at least some of the frames of the GOP, using a first encoding pass to obtain encoding statistics. In an example, the some of the frames of the GOP can be frames of a lookahead window, as described above. The lookahead window can be a set of frames used in a rate-control stage, which performs a first pass encoding to collect encoding statistics. The first encoding pass can use any pre-selected and consistently used encoding structure, as described above.

In an example of the encoding structure used in the first encoding pass, the encoder can encode the frames of the group of frames in the display order of the frames. As such, in the first encoding pass, a frame of the GOP is encoded using an immediately preceding frame in display order of the GOP. The first encoding pass can include other encoding simplifications. For example, the first encoding pass can include partitioning each frame of the group of frames into fixed-size blocks. The fixed-size blocks can be 16×16, 32×32, or another fixed size. In an implementation, the block size can be selected based on the resolution of the source video. For example, a block size of 64×64, 128×128, or larger or smaller size, can be selected for 4K video sequences. The first encoding pass can perform only integer motion search for the fixed-size blocks. That is, the encoder does not perform sub-pixel (i.e., fractional) motion search. Sub-pixel motion refers to a motion vector that points to a location that is between pixels of blocks in the reference frame. Another simplification can include disabling some encoding modes. For example, compound prediction may be disabled. Other simplifications may be available.

Many encoding statistics can be collected during the first pass encoding. Examples of encoding statistics are provided herein. However, the disclosure is not limited to those listed. The encoding statistics can form, or can be part of, a temporal dependency model.

In an example, the encoding statistics can include a number of zero-motion blocks, which measures the number of blocks within the frames that use a zero motion vector. A zero motion vector is a motion vector that uses (0, 0) as the vertical and horizontal offsets.

Motion estimation is performed for blocks of the at least some of the frames of the GOP. The motion estimation results in respective predictor blocks being associated with blocks of the at least some of the frames of the GOP. Prediction errors can be calculated between the respective predictor blocks and blocks of the frames. As such, for a frame, the calculation results in a frame error (i.e., an error for the whole frame). The frame error can be divided by the number of pixels in the frame to determine a per-pixel error for the frame. The block errors, the frame errors, and/or the per-pixel error can be encoding statistics. Other encoding statistics are also described above and below.

At 1204, the technique 1200 obtains, using the encoding statistics, respective temporal dependency likelihoods (TDLs) for the at least some of the frames of the GOP. As described above, the respective TDLs indicate contributions that the at least some of the frames make in reducing prediction errors of the GOP.

In an example, and as described above, obtaining, using the encoding statistics, the respective TDLs for the at least some of the frames of the GOP can include obtaining for the at least some of the frames of the GOP, using the encoding statistics, respective temporal correlation scores. A respective temporal correlation score of a frame can indicate a correlation of the frame with a previous frame in display order that is used for encoding the frame in the first encoding pass. In an example, the respective temporal correlation score of the frame can be calculated based on a number of inter-predicted blocks in frames the at least some of the frames of the GOP. The number of inter-predicted blocks in at least some of the encoded frames in the first pass encoding can be, or can be included, in the encoding statistics.

In an example, and as described above with respect to FIG. 11, the TDL of a frame of the GOP can be calculated by summing a backward contribution and a forward contribution of the frame. The backward contribution can include a first sum of products of respective temporal correlation scores of frames preceding the frame in the GOP. The forward contribution can include a second sum of products of respective temporal correlation scores of frames succeeding the frame in the GOP.

At 1206, the technique 1200 obtains a reference frame based on the respective TDLs. In an example, and as described above, obtaining the reference frame based on the respective TDLs can include selecting at least one frame of the GOP corresponding to highest TDLs of the respective TDLs, and synthesizing the reference frame from the at least one frame of the GOP.

In an example, the at least one frame of the GOP includes more than one frame of the GOP and synthesizing the reference frame from the at least one frame of the GOP can include pixel-wise combining the more than one frame of the GOP using the respective TDLs of the more than one frame of the GOP as weights, as described above.

In an example, obtaining the reference frame based on the respective TDLs can include selecting a frame of the GOP corresponding to a highest TDL as the reference frame. In an example, the technique 1200 can further include adding the obtained reference frame to a reference frame buffer, as described with respect to FIG. 6.

At 1208, the technique 1200 uses the reference frame in encoding at least some of the frames of the GOP in a second encoding pass, as described above.

Figure 13:
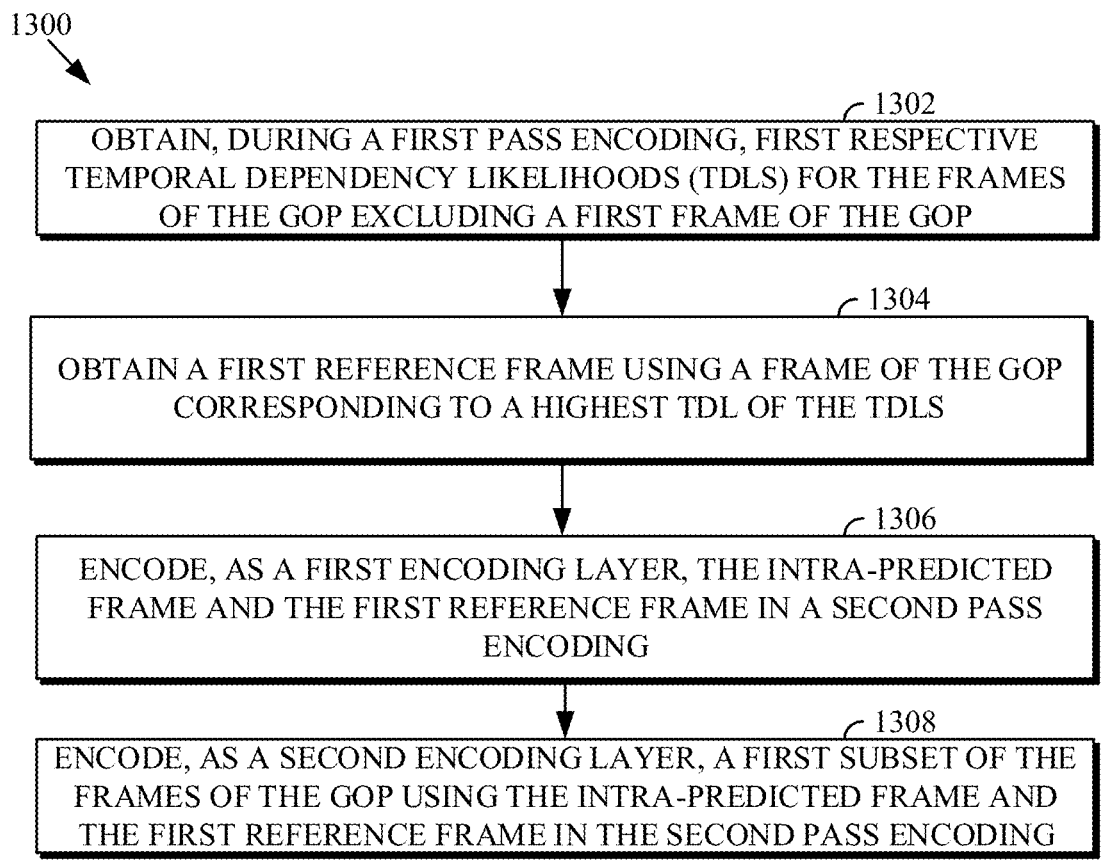
FIG. 13 is a flowchart diagram of another technique for encoding a group of pictures (GOP) that includes frames of a video according to an implementation of this disclosure.

FIG. 13 is a flowchart diagram of another technique 1300 for encoding a group of pictures (GOP) that includes frames of a video according to an implementation of this disclosure. The technique 1300 obtains (e.g., selects, chooses, identifies, determines, etc.) obtains reference frames for encoding the frames of the GOP in a multi-layer coding structure. The technique 1300 can be, or can be used to, identify an encoding structure of the frames of the GOP.

The technique 1300 can be implemented, for example, as a software program that may be executed by computing devices (e.g., apparatuses, etc.) such as transmitting station 102. For example, the software program can include machine-readable instructions that may be stored in a memory such as the memory 204 or the secondary storage 214, and that, when executed by a processor, such as CPU 202, may cause the computing device to perform the technique 1300. The technique 1300 can be implemented using specialized hardware or firmware. As explained above, some computing devices may have multiple memories or processors, and the operations described in the technique 1300 can be distributed using multiple processors, memories, or both. The technique 1300 can be implemented by an encoder, such as the encoder 400 of FIG. 4. The technique 1300 can be, at least partially, implemented by rate-control stage of the encoder. The technique 1300 may be at least partially implemented in an offline process that receives a video sequence (already compressed or otherwise) that transcodes the video sequence into different formats.

At 1302, the technique 1300 obtains, during a first pass encoding, first respective temporal dependency likelihoods (TDLs) for the frames of the GOP excluding a first frame of the GOP. A TDL of a frame of the GOP can be a measure of a prediction error when the frame is used as a reference frame for encoding frames of the GOP. The first frame of the GOP can be an intra-predicted frame, such as described with respect to the frame 1002 of FIG. 10A. In an example, and as described above, in the first pass encoding, a frame of the GOP can be encoded using an immediately preceding frame, in display order, as a reference frame.

In an example, obtaining, during the first pass encoding, the first respective TDLs for the frames of the GOP excluding the first frame of the GOP can include obtaining for the at least some of the frames of the GOP, using encoding statistics of the first pass encoding, respective temporal correlation scores, wherein a respective temporal correlation score of a frame indicates a correlation of the frame with a previous frame in display order that is used for encoding the frame in the first encoding pass.

At 1304, the technique 1300 obtains a first reference frame using a frame of the GOP corresponding to a highest TDL of the TDLs. In an example, the technique 1300 can obtain, from the frame of the GOP corresponding to the highest TDL, an alternate reference frame to use as the first reference frame. In an example, the technique 1300 can use the frame of the GOP corresponding to the highest TDL as the first reference frame. In an example, the first reference frame can be as described with respect to the frame 1010 of FIG. 10A.

At 1306, the technique 1300 encodes, as a first encoding layer, the intra-predicted frame and the first reference frame in a second pass encoding, as described with respect to FIG. 10A.

At 1308, the technique 1300 encodes, as a second encoding layer, a first subset of the frames of the GOP using the intra-predicted frame and the first reference frame in the second pass encoding.

In an example, and as described with respect to FIGS. 10A-10B, the technique 1300 can further include obtaining a second subset of the frames of the GOP, where the second subset includes first frames of the GOP preceding the first reference frame in display order; obtaining a third subset of the frames of the GOP, where the third subset includes second frames of the GOP succeeding the reference frame in display order; obtaining a second reference frame for the second subset of the frames of the GOP using respective TDLs of the first frames of the GOP; obtaining a third reference frame for the third subset of the frames of the GOP using respective TDLs of the second frames of the GOP; encoding, in the second pass encoding, at least some of the first frames using the intra-predicted frame, the first reference frame, and the second reference frame as first available reference frames; and encoding, in the second pass encoding, at least some of the second frames using the intra-predicted frame, the first reference frame, and the third reference frame as second available reference frames.

In an example, the technique 1300 can include the first reference frame, the second reference frame, and/or the third reference frame in a reference frame buffer, as described with respect to FIG. 6.

An encoder according to implementations of this disclosure can encode the obtained reference frames in a compressed bitstream. Thus, a decoder decoding a GOP that is encoded using a reference frame obtained as described herein can decode the reference frame from the compressed bitstream and decode at least one of frames of the GOP using the reference frame.

In an example, an encoder can encode the TDLs of at least some of the frames in the bitstream, such as in the headers of the frames. The decoder can use the encoded TDLs to determine an importance of a frame, such as for the purpose of determining further processing of the frames based on the TDLs. In an example, the decoder can use the TDLs to determine whether to perform subsampling of the frames.

Implementations according to this disclosure can result in substantial encoder improvements. For example, when incorporated into the VP9 hardware encoder, up to 2% in average Bjontegaard rate difference, BD-rate, peak signal-to-noise ratio (PSNR), expressed in decibels improvement was obtained, as shown in Table III.

TABLE III

| Video Formats | Mean BD-Rate (PSNR) | Median BD-Rate (PSNR) | Mean BD-Rate (SSIM) | Median BD-Rate (SSIM) |
| --- | --- | --- | --- | --- |
| 256 × 144 | −1.356148356 | −0.9716482148 | −1.406068257 | −1.097227198 |
| 426 × 240 | −1.105730553 | −0.6502105596 | −0.9511849721 | −0.5648809367 |
| 640 × 360 | −0.8861289436 | −0.4875879926 | −0.7523535616 | −0.4111531332 |
| 854 × 480 | −0.7214186231 | −0.4027349569 | −0.5252784576 | −0.1974546331 |
| 1280 × 720 | −0.7846104437 | −0.6481254073 | −0.516957842 | −0.5196401042 |
| 1920 × 1080 | −0.7386706585 | −0.5492957878 | −0.480582069 | −0.4980809597 |
| 2560 × 1440 | −0.3244928269 | −1.15448762 | −1.175173148 | −1.059626655 |
| 3840 × 2160 | −2.035945084 | −1.226096866 | −2.070080734 | −1.346627178 |

For simplicity of explanation, the techniques 800, 1200, and 1300 of FIGS. 8, 12, and 13, respectively, are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coding a group of pictures (GOP) that includes frames of a video, comprising:
   encoding, at least some of the frames of the GOP, using a first encoding pass to obtain encoding statistics;
   obtaining, using the encoding statistics, respective temporal dependency likelihoods (TDLs) for the at least some of the frames of the GOP, wherein the TDL of a frame is a score that indicates contributions that the frame makes in reducing prediction errors of the GOP and is indicative of dependence, on the frame, of respective residuals of frames of the GOP coded subsequent to the frame;
   obtaining a reference frame based on the respective TDLs; and
   using the reference frame in encoding at least some of the frames of the GOP in a second encoding pass.

2. The method of claim 1, wherein, in the first encoding pass, a frame of the GOP is encoded using an immediately preceding frame in display order of the GOP.

3. The method of claim 1, wherein obtaining the reference frame based on the respective TDLs comprises:
   selecting at least one frame of the GOP corresponding to highest TDLs of the respective TDLs; and
   synthesizing the reference frame from the at least one frame of the GOP.

4. The method of claim 3,
   wherein the at least one frame of the GOP comprises more than one frame of the GOP, and
   wherein synthesizing the reference frame from the at least one frame of the GOP comprises:
      pixel-wise combining the more than one frame of the GOP using the respective TDLs of the more than one frame of the GOP as weights.

5. The method of claim 1, wherein obtaining the reference frame based on the respective TDLs comprises:
   selecting a frame of the GOP corresponding to a highest TDL as the reference frame.

6. The method of claim 1, wherein obtaining, using the encoding statistics, the respective TDLs for the at least some of the frames of the GOP comprises:
   obtaining for the at least some of the frames of the GOP, using the encoding statistics, respective temporal correlation scores, wherein a respective temporal correlation score of a frame indicates a correlation of the frame with a previous frame in display order that is used for encoding the frame in the first encoding pass.

7. The method of claim 6, wherein the respective temporal correlation score of the frame is calculated based on a number of inter-predicted blocks in frames the at least some of the frames of the GOP.

8. The method of claim 7,
   wherein the TDL of a frame of the GOP is calculated by summing a backward contribution and a forward contribution of the frame,
   wherein the backward contribution comprises a first sum of products of respective temporal correlation scores of frames preceding the frame in the GOP, and
   wherein the forward contribution comprises a second sum of products of respective temporal correlation scores of frames succeeding the frame in the GOP.

9. The method of claim 1, further comprising:
   adding the obtained reference frame to a reference frame buffer.

10. An apparatus for encoding a group of pictures (GOP) that includes frames of a video, comprising:
    a processor configured to:
       obtain, during a first pass encoding, first respective temporal dependency likelihoods (TDLs) for the frames of the GOP excluding a first frame of the GOP,
    wherein a TDL of a frame of the GOP is a score that is indicative of a prediction error when the frame is used as a reference frame for encoding frames of the GOP and is indicative of dependence, on the frame of the GOP, of respective residuals of frames of the GOP encoded subsequent to the frame, and wherein the first frame of the GOP is an intra-predicted frame;

obtain a first reference frame using a frame of the GOP corresponding to a highest TDL of the TDLs; and encode, as a first encoding layer, the intra-predicted frame and the first reference frame in a second pass encoding; and encode, as a second encoding layer, a first subset of the frames of the GOP using the intra-predicted frame and the first reference frame in the second pass encoding.

11. The apparatus of claim 10, wherein the processor is further configured to:

obtain a second subset of the frames of the GOP, wherein the second subset comprises first frames of the GOP preceding the first reference frame in display order;

obtain a third subset of the frames of the GOP, wherein the third subset comprises second frames of the GOP succeeding the reference frame in display order;

obtain a second reference frame for the second subset of the frames of the GOP using respective TDLs of the first frames of the GOP;

obtain a third reference frame for the third subset of the frames of the GOP using respective TDLs of the second frames of the GOP;

encode, in the second pass encoding, at least some of the first frames using the intra-predicted frame, the first reference frame, and the second reference frame as first available reference frames; and encode, in the second pass encoding, at least some of the second frames using the intra-predicted frame, the first reference frame, and the third reference frame as second available reference frames.

12. The apparatus of claim 10, wherein, in the first pass encoding, a frame of the GOP is encoded using an immediately preceding frame, in display order, as a reference frame.

13. The apparatus of claim 10, wherein to obtain the first reference frame using the frame of the GOP corresponding to the highest TDL of the TDLs comprises to:

obtain, from the frame of the GOP corresponding to the highest TDL, an alternate reference frame to use as the first reference frame.

14. The apparatus of claim 10, wherein to obtain the first reference frame using the frame of the GOP corresponding to the highest TDL of the TDLs comprises to:

use the frame of the GOP corresponding to the highest TDL as the first reference frame.

15. The apparatus of claim 10, wherein to obtain, during the first pass encoding, the first respective TDLs for the frames of the GOP excluding the first frame of the GOP comprises to:

obtain for the at least some of the frames of the GOP, using encoding statistics of the first pass encoding, respective temporal correlation scores, wherein a respective temporal correlation score of a frame indicates a correlation of the frame with a previous frame in display order that is used for encoding the frame in the first encoding pass.

16. The apparatus of claim 10, wherein the processor is further configured to:

add the first reference frame to a reference frame buffer.

17. An apparatus for decoding a group of pictures (GOP) that includes frames of a video, comprising:

a processor configured to:

decode a reference frame from a compressed bitstream; and decode at least one of frames of the GOP using the reference frame, wherein an encoder encoded the reference frame in the compressed bitstream by operations including operations to:

encode, at least some of the frames of the GOP, using a first encoding pass to obtain encoding statistics;

obtain, using the encoding statistics, respective temporal dependency likelihoods (TDLs) for the at least some of the frames of the GOP by operations to:

obtain for the at least some of the frames of the GOP, using the encoding statistics, respective temporal correlation scores, wherein a respective temporal correlation score of a frame indicates a correlation of the frame with a previous frame in display order that is used for encoding the frame in the first encoding pass;

obtain the reference frame based on the respective TDLs; and use the reference frame in encoding at least some of the frames of the GOP in a second encoding pass.

18. The apparatus of claim 17, wherein, in the first encoding pass, a frame of the GOP is encoded using an immediately preceding frame in display order of the GOP.

19. The apparatus of claim 17, wherein to obtain the reference frame based on the respective TDLs comprises to:

select at least one frame of the GOP corresponding to highest TDLs of the respective TDLs; and synthesize the reference frame from the at least one frame of the GOP.

20. The apparatus of claim 19, wherein the at least one frame of the GOP comprises more than one frame of the GOP, and wherein to synthesize the reference frame from the at least one frame of the GOP comprises:

pixel-wise combine the more than one frame of the GOP using the respective TDLs of the more than one frame of the GOP as weights.

* * * * *